United States Patent
Likhomanov et al.

(10) Patent No.: US 12,389,109 B1
(45) Date of Patent: Aug. 12, 2025

(54) ACCELERATION AND IMAGE BASED MOTION DETECTION IN VEHICLES

(71) Applicant: Amazon Technologies, Inc., Seattle, WA (US)

(72) Inventors: Dmytro Likhomanov, Kyiv (UA); Oleh Borovyk, Kyiv (UA); Sergii Savychenko, Kyiv (UA); Bohdan Bobyl, Kyiv (UA); Ihor Morozov, Kyiv (UA); Oksana Shyshka, Kyiv (UA); Sergii Vodopian, Kyiv (UA); Serhii Drozd, Kyiv (UA); Taras Khalymon, Kyiv (UA)

(73) Assignee: Amazon Technologies, Inc., Seattle, WA (US)

( * ) Notice: Subject to any disclaimer, the term of this patent is extended or adjusted under 35 U.S.C. 154(b) by 18 days.

(21) Appl. No.: 18/129,294

(22) Filed: Mar. 31, 2023

(51) Int. Cl.
  *H04N 23/00* (2023.01)
  *H04N 7/18* (2006.01)
  *H04N 23/60* (2023.01)

(52) U.S. Cl.
  CPC ............ *H04N 23/64* (2023.01); *H04N 7/181* (2013.01)

(58) Field of Classification Search
  None
  See application file for complete search history.

(56) References Cited

U.S. PATENT DOCUMENTS

| | | | |
|---|---|---|---|
| 7,183,549 B2* | 2/2007 | Teich | H04N 7/181 348/E7.086 |
| 2016/0144505 A1* | 5/2016 | Fong | G05D 1/0274 700/250 |
| 2017/0070677 A1* | 3/2017 | Nilsson | H04N 23/689 |
| 2019/0392233 A1* | 12/2019 | Katsumata | G06V 20/593 |
| 2020/0137351 A1* | 4/2020 | Bai | H04N 7/12 |
| 2020/0211347 A1* | 7/2020 | Stewart | G06V 20/52 |
| 2020/0327315 A1* | 10/2020 | Mullins | G06V 20/52 |
| 2021/0064147 A1* | 3/2021 | Arora | G06V 40/28 |
| 2022/0239513 A1* | 7/2022 | Swierk | G06V 40/18 |
| 2022/0254045 A1* | 8/2022 | Boardman | H04N 23/695 |
| 2022/0377242 A1* | 11/2022 | Camacho | H04N 23/61 |
| 2023/0049899 A1* | 2/2023 | Yeh | G02B 27/30 |
| 2024/0071191 A1* | 2/2024 | Mullins | G08B 13/19697 |

* cited by examiner

*Primary Examiner* — Daniel T Tekle
(74) *Attorney, Agent, or Firm* — Eversheds Sutherland (US) LLP

(57) ABSTRACT

A method includes receiving first data associated with an acceleration of a first device, determining that the acceleration is greater than a first threshold, receiving second data generated by a camera, determining, based at least in part on the second data, a difference between first pixels within a first frame and second pixels with a second frame, determining that the difference is greater than a second threshold, and sending third data to a second device.

23 Claims, 18 Drawing Sheets

| -1 | 12 | -6 | 2 | -10 |
|---|---|---|---|---|
| -4 | 4 | -192 | 3 | 174 |
| 2 | -20 | -573 | -169 | 557 |
| -2 | -264 | -780 | -331 | 591 |
| -229 | -498 | -593 | -141 | 250 |

Gx Values

Gx Values

| | | | | |
|---|---|---|---|---|
| -1 | 12 | -6 | 2 | -10 |
| -4 | 4 | -192 | 3 | 174 |
| 2 | -20 | -573 | -169 | 557 |
| -2 | -264 | -780 | -331 | 591 |
| -229 | -498 | -593 | -141 | 250 |

Gy Values

| | | | | |
|---|---|---|---|---|
| 7 | -8 | -8 | -4 | -10 |
| -6 | -2 | -196 | -385 | -194 |
| -10 | -32 | -243 | -607 | -587 |
| 16 | -210 | -450 | -455 | -603 |
| -571 | -806 | -613 | -231 | -234 |

FIG. 5E

ACCELERATION AND IMAGE BASED MOTION DETECTION IN VEHICLES

BACKGROUND

Security is a concern for many property owners. Systems and devices may include sensors that active to capture events (e.g., break-ins), which in turn, may be used to apprehend offenders. Unfortunately, these systems and devices may fail to accurately detect events and in such instances, the systems and devices do not adequately monitor their intended environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIGS. 5A-5E illustrates a canny edge detector for identifying edges or lines within image/video data generated by the device of FIG. 1, according to an example of the present disclosure.

DETAILED DESCRIPTION

Figure 1:
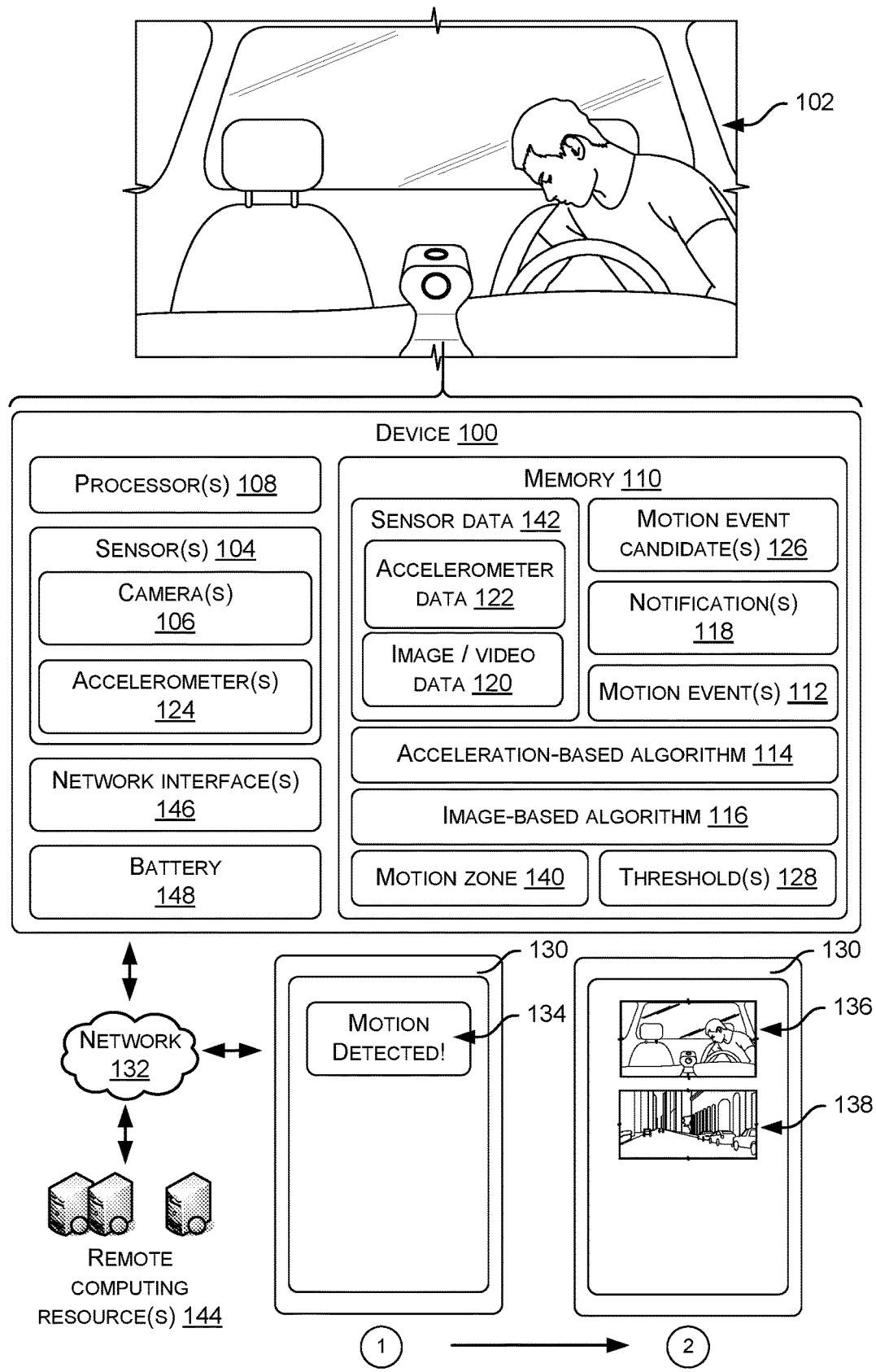
FIG. 1 illustrates an example device used to detect motion events within a vehicle and provide notifications, according to an example of the present disclosure.

This application is directed, at least in part, to a device that determines motion events within a vehicle using accelerometer data and/or image/video data. The device, for example, may include an accelerometer that generates the accelerometer data, and one or more cameras, such as an interior facing camera and an exterior facing camera, that generate the image/video data. Initially, the accelerometer may generate the accelerometer data, and in response, the device may determine whether the accelerometer data is indicative of the device experiencing a threshold amount of acceleration. If the amount of acceleration is greater than the threshold, the device may cause the interior facing camera to capture the image/video data. The image/video data as captured by the interior facing camera may be used to confirm the presence of the motion event within the vehicle. For example, the image/video data may be analyzed to determine whether an intruder is in the vehicle. In some instances, the image/video data is analyzed to determine difference in pixels between frames, where the difference in pixels may be indicative of motion in the vehicle. If the image/video data confirms (e.g., verifies) the motion event, the device may generate a notification that is sent to a user device (e.g., a mobile phone, tablet, etc.) indicating the motion event. The notification may include image/video data as generated by the interior facing camera and/or the exterior facing camera to inform a user of the motion event. As such, the device may use a multi-stage approach for accurately detecting motion events within the vehicle.

The vehicle may represent any suitable vehicle, such as a car, truck, bus, boat, airplane, and so forth. In some instances, the device is configured to be wedged between a windshield and a dashboard of the vehicle. For example, an end (e.g., foot) of the device may wedge between the windshield and the dashboard for disposing the device within the vehicle. The interior facing camera may be directed towards an interior of the vehicle (e.g., seats, steering wheel, etc.), while the exterior facing camera may be directed towards an exterior of the vehicle (e.g., through the windshield, towards the hood, in front of the vehicle, etc.). However, although described as being located at or on the dashboard (e.g., wedged between the dashboard and the windshield), the device may be located at other locations within or on the vehicle. In such instances, the device may be coupled to brackets, mounts, and the like for disposing the device within the vehicle.

In some instances, the device employs an acceleration-based algorithm and/or an image-based algorithm for determining motion events and providing notifications to the user. In some instances, the acceleration-based algorithm may include multiple stages, such as a first stage and a second stage that is after (e.g., subsequent to) the first stage. The first stage may correspond to a motion event candidate filtering stage that operates on raw accelerometer data to filter events for the second stage, which performs a discrete Fourier transform (DFT) using a fast Fourier transform (FFT) algorithm on the accelerometer data to confirm or deny the motion event candidates. For example, the first stage may serve as a filter that detects if the accelerometer data might be considered a motion event candidate. In some instances, during the first stage, an average of the accelerometer data is taken over a period of time (e.g., one second) for each axis. If the average acceleration for at least one of the axes is above a threshold or outside of an expected range (e.g. outside of an epsilon-interval), the period of time may be considered to have a motion event candidate. The second stage may be more computationally complex as compared to the first stage, to either confirm or deny the motion event candidate. Additionally, as will be discussed herein, the acceleration-based algorithm may be used to trigger the image-based algorithm. For example, if the first stage and/or the second stage of the acceleration-based algorithm determine the motion event, the image-based algorithm may confirm the motion event for providing notification(s) to the user.

More specifically, and as indicated above, the accelerometer is configured to generate accelerometer data, which indicates an amount of acceleration experienced by the device. In some instances, the accelerometer data indicates an acceleration of the device along separate axes (e.g., X, Y, and Z). In some instances, the accelerometer continuously generates the accelerometer data, and the device may determine whether the acceleration along the separate axes is greater than the threshold acceleration. For example, in response to break-ins (e.g., window), doors of the vehicle opening, and so forth, the accelerometer may generate the accelerometer data, and the acceleration along each of axes may be compared against the threshold acceleration. In some instances, if the acceleration along any of the axes is greater than the threshold acceleration, the device may flag the motion as a motion event candidate. In other instances, the acceleration along each of the axes may have to be greater than the threshold acceleration. Therein, the device may further process the accelerometer data, during the second stage, to either confirm the motion event candidate as a motion event or to disaffirm the motion event candidate as a motion event.

The second stage of the acceleration-based algorithm is performed based on the first stage indicating the motion event candidate. In some instances, the FFT is calculated using a series of 128 input accelerometer values for each axis. For example, over the period of time, the FFT may receive 128 accelerator values for each axis. The FFT converts the acceleration data from the time domain (e.g., amplitude over time) to frequency domain. A predetermined number of bins from the frequency domain data are selected and the corresponding values summed together. In some instances, the predetermined number of bins from the frequency domain data represents ten percent of the bins, specifically the bins having the highest corresponding values. For each axis, the values of the selected frequency bins are summed together. This results in three values, one per axis. The value for each axis is compared to a respective threshold for that axis. As the axes are related to the device orientation, each axis may have a different threshold. In some instances, if the values for all of the axes are each greater than the respective threshold, the motion event candidate is confirmed as a motion event. In some instances, if the values for one of the axes is greater than the respective threshold, the motion event candidate is confirmed as a motion event. In some instances, if the values for two of the axes is greater than the respective threshold, the motion event candidate is confirmed as a motion event.

For example, for each axis, the FFT may be applied to accelerometer values of time-domain data to generate three sets of frequency-domain data. The three sets of frequency-domain data may be for each axis. In other words, frequency-domain data may be generated for a first axis (e.g., X-axis), frequency-domain data may be generated for a second axis (e.g., Y-axis), and frequency-domain data may be generated for a third axis (e.g., Z-axis). For each axis, a predetermined number of frequency coefficients (e.g., 10%) that represent the highest magnitude frequencies are selected. These magnitude frequency values may be summed for each axis to obtain three values, one for each axis, where the three values represent a sum of the largest frequency values for the accelerometer data over a period of time. Once the values are summed, each of the three values (e.g., a value for the X-axis, a value for the Y-axis, and a value for the Z-axis) may be compared to a respective threshold. The thresholds to which the three values are compared may be different depending upon the axis. For example, the value for the X-axis may be compared to a first threshold, the value for the Y-axis may be compared to a second threshold that is different than the first threshold, and/or the value for the Z-axis may be compared to a third threshold that is different than the second threshold. In some instances, the first threshold, the second threshold, and/or the third threshold may be predetermined thresholds determined based on historical data.

In some instances, if all of the values are greater than their respective thresholds, the motion event candidate may be confirmed as a motion event. Alternatively, if one of the values is greater than its respective threshold, the motion event candidate may be confirmed as a motion event. As such, using the acceleration-based algorithm, at a first stage the device may determine whether the accelerometer data along any of the axes is greater than a threshold acceleration, and if so, at the second stage, the device may perform the FFT on the accelerometer data, obtain three values that represent a sum of the largest frequency values for the accelerometer data over the period of time to determine whether the values are greater than thresholds.

As a result of determining the motion events (e.g., confirming the motion event candidates), the device may cause the interior facing camera and/or the exterior facing camera to begin generating (e.g., capturing) the image/video data. In some instances, the image/video data may be sent via a notification to the user. In some instances, the notification may indicate the present of the motion event and/or the image/video data as captured by the interior facing camera and/or the exterior facing camera. For example, the device may transmit a stream of image/video data (e.g., from the interior facing camera and/or the exterior facing camera) to a user device of the user.

At this point, the device may use only the acceleration-based algorithm to determine the motion event and send the notification to the user. However, in some instances, the device is configured to utilize the acceleration-based algorithm (and the accelerometer data) and the image-based algorithm (and the image/video data) to determine the motion events. Whether the acceleration-based algorithm and/or the image-based algorithm is used to determine the motion events may be based on setting(s) of the device (e.g., as determined via the user) or the device being in privacy mode. For example, the user may configure the device to use both the acceleration-based algorithm and the image-based algorithm to reduce false-positive motion events. Additionally, the device may include a cover that is moveable between an extended position to obstruct the interior facing camera (e.g., for privacy) and a retracted position to unobstruct the interior facing camera. For example, in the extended position and in the privacy mode, the cover may be disposed over the interior facing camera to obstruct the interior facing camera to provide privacy, and may be moved out of the way in the retracted position to unobstruct the interior facing camera. In some instances, depending upon the position of the cover, the device may be configured to determine or confirm the motion event candidates according to different criteria.

For example, if the cover is disposed over the interior facing camera, the device is unable to record the image/video data of the interior of the vehicle for confirming the motion events. In such instances, the device may utilize the acceleration-based algorithm for determining the presence of the motion events. That is, noted above, the acceleration-based algorithm may employ the first stage for determining motion event candidates, and the second stage for confirming or denying the motion event candidates as motion events. Here, the image-based algorithm may not be used.

However, if the cover is in the retracted position, the device may employ the image-based algorithm for confirming the motion event candidate.

In some instances, the interior facing camera may be activated (e.g., powered on) to generate the image/video data based on the first stage and/or the second stage of acceleration-based algorithm. For example, in response to the acceleration along any of the axes being greater than the threshold acceleration (i.e., the first stage), the device may cause the interior facing camera to begin capturing the image/video data for analysis by the image-based algorithm. Alternatively, in some instances, the interior facing camera may be activated to generate the image/video data based on the three values that represent the sum of the largest frequency values for the accelerometer data along each axis being greater than their respective thresholds. In this sense, the device may use the image-based algorithm after the first stage and/or the second stage of the acceleration-based algorithm. For example, if the cover is in the retracted position, only the first stage of the acceleration-based algorithm may be performed as the image/video data may be used to filter out false positive motion events.

In some instances, the device may confirm motion event candidates (as determined using the accelerometer data) using the image-based algorithm based on differences between consecutive frames in the image/video data. The image-based algorithm may analyze consecutive frames within the image/video data to determine an amount of pixels that are different. By analyzing the pixels across consecutive frames, and determining that a threshold number of the pixels are different, the motion event candidate may be confirmed as a motion event. In some instances, if there are a threshold number of pixels that are different between consecutive frames, the frames may be considered different.

More specifically, as frames are captured, the frames may be compared to a previous frame by counting the number of pixels that differ by more than a threshold amount. In some instances, if the pixel values differ by more than 25-35 on a 255 scale, the pixels may be considered different. If the percentage of such pixels (i.e., those that have been determined to differ between the frames) is greater than another threshold (e.g. 0.12*a time difference in seconds between the frames), then the frames may be considered different. The system updates a counter of different frames. If the percentage of frames identified as different is greater than another threshold, then motion is verified. If a configured amount of time (e.g. 5 seconds) passes without motion being verified, motion is considered to not be verified.

In some instances, if there are a threshold number of frames that are identified as different across a given internal of time, the motion event candidate is verified. In other words, if there are a threshold number of different pixels among two frames (e.g., consecutive frames), the frames are considered different, and if there are a threshold number of different frames over a given period of time, the motion event candidate is verified. In response to a motion event candidate being confirmed using an image-based algorithm, the device may cause the device may cause the interior facing camera and/or the exterior facing camera to begin generating image/video data that is sent to the user device within the notification. This image/video data may serve as a stream to provide the user with views of the interior and exterior of the vehicle, respectively. In some instances, the device may send the notification (including the image/video data) directly or indirectly to the device (e.g., via remote computing resource(s)).

As noted, and in some instances, the amount or duration of the frames used to verify the motion events may be over a certain time period. For example, in some instances, 1.2 seconds worth of frames may be compared to one another to determine the differences therebetween and whether the motion event candidate is verified. However, other time periods are envisioned. For example, 5.0 seconds worth of frames may be compared to one another to determine the differences therebetween and whether the motion event candidate is verified. However, in some instances, the device may confirm the motion event within a certain period of time after capturing the image/video data. For example, if a threshold amount of time lapses without motion being confirmed via the image/video data, the motion event may not be confirmed. In response, the notification may not be sent to the user.

In some instances, only a portion of the image/video data is analyzed to confirm the motion event candidate. This portion of the image/video data may be considered a motion zone. The motion zone may be considered a portion of a field of view of the interior facing camera. For example, certain portions of the image/video data may include the interior of the vehicle, while other portions of the image/video data may include the exterior of the vehicle (e.g., exterior to the windows). That is, being as the interior facing camera is oriented towards the interior of the vehicle, the image/video data may capture portions of an environment external to the vehicle. To avoid detecting motion events outside of the vehicle, thereby notifying the use of inadvertent alerts, the image-based algorithm may only analyze the motion zone of the image/video data that is within the vehicle. For example, to avoid detecting pedestrians, vehicles, or other objects moving in proximity to the vehicle, only the motion zone of the image/video data that represents the interior of the vehicle may be analyzed for determining an amount of pixels that are different between consecutive frames. Given the placement of the device in the interior, the motion zone may be a bottom area of the frame that includes the interior of the vehicle without the windows.

In some instances, the motion zone may be selected by default, for example, by determining an average motion zone across a dataset of motion zones (e.g., for different vehicles). For example, the motion zone may be preconfigured and based on a historical layout of windows, dashboards, and so forth. In some instances, the motion zone may be programmable based on the type, make, and/or model of the vehicle. Still, in some instances, the motion zone may be programmable via the user. For example, once placed within the vehicle, the user may drag or otherwise manipulate boundaries of the motion zone. In some instances, the motion zone may be updated based on newer datasets, based on an analysis to determine features (e.g., windows) for automatically locating the motion zone, pixel weighting (e.g., those pixels located more distant from windows, or in a center of the portion), and so forth. For example, using the image/video data generated by the interior facing camera, the motion zone may be automatically determined by identifying edges, lines, features, and so forth within the vehicle. These edges, lines, and so forth may represent windows of the vehicle, and may be detected using canny edge detection algorithms, Hough line transformation algorithms, line segment detection algorithms, and so forth. The motion zone may be applied as a mask to the image/video data, and thereafter, the pixels within the mask may be analyzed by the image-based algorithm for confirming the motion event candidate.

In some instances, the user of the device may configure sensitivities of the device. For example, the user may lower thresholds used by the acceleration-based algorithm and/or the image-based algorithm for being notified of an increased number of motion events (e.g., as compared to heightening the thresholds). Moreover, the user may define the threshold used by the acceleration-based algorithm and/or the image-based algorithm based on the position of the cover. Still, in some instances, the thresholds used by the acceleration-based algorithm and/or the image-based algorithm may be programmatically set based on whether the image/video data is used to confirm the motion event candidates. For example, if the image-based algorithm is used to confirm the motion event candidates, lower thresholds may be used during the first stage of the acceleration-based algorithm. Comparatively, if the image-based algorithm is not used to confirm the motion events, the first stage and/or the second stage of the acceleration-based algorithm may have heightened threshold being as the image-based algorithm will be unable to filter out false positive motion events. Additionally, the user may also determine which algorithms are used to determine the motion event candidates and/or the motion events (e.g., whether the acceleration-based algorithm and/or the image-based algorithm).

In some instances, the device may use sensor data generated from other sensor(s) of the device and/or within the vehicle to detect and/or confirm motion events. For example, audio data generated by microphones may be used to detect sound. As another example, infrared (IR) sensor(s) may be used to detect motion events within the vehicle. Additionally, the sensitivities for detecting and/or confirming the motion events may be configurable. For example, the user may define the acceleration threshold used to detection motion events.

Accordingly, in light of the above, the device may use an acceleration-based algorithm that processes accelerometer data and/or an image-based algorithm that processes image/video data to detect and confirm motion events. In some instances, the device employs a multi-stage approach, using the acceleration-based algorithm and the image-based algorithm that analyzes the accelerometer data and the image/video data, respectively, to determine motion events. For example, the device may awake in response to the accelerometer data indicating a motion event candidate, and thereafter, the interior facing camera may be used to verify the motion event. In some instances, whether the device employs the acceleration-based algorithm and/or the image-based algorithm may be based on a position of a cover (e.g., privacy cover) of the device and/or setting(s) set by the user. By accurately identifying motion events, user experience is increased, less battery power is consumed when the device activates in response to falsely detected motion events, and less computing resources are consumed storing the image/video data (e.g., remote computing resource(s)) in response to falsely detected motion events.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example device 100 used to detect motion, according to examples of the present disclosure. The device 100 is shown being disposed within an environment, such as a vehicle 102, for detecting motion. In some instances, the device 100 is configured to be wedged between a windshield and a dashboard of the vehicle 102. For example, an end (e.g., foot) of the device 100 may wedge between the windshield and the dashboard for disposing the device 100 within the vehicle 102. In doing so, the device 100 may receive (or detect) motion imparted to the vehicle 102 (e.g., in response to doors opening, people sitting in seats, etc.). In other words, because of the coupling of the device 100 to the vehicle 102, motion experienced by the vehicle 102 is imparted to the device 100.

As will be explained herein, the device 100 may include various sensor(s) 104, such as a first camera 106(1) (e.g., an interior facing camera) directed towards an interior of vehicle 102 (e.g., seats, steering wheel, etc.), and a second camera 106(2) (e.g., an exterior facing camera) directed towards an exterior of the vehicle 102 (e.g., through the windshield, towards the hood, etc.). However, although described herein as finding use in the vehicle 102, the device 100 (or the methods performed by the device 100) may be implemented in other environments, applications, and so forth. Additionally, although described as being located at or on the dashboard (e.g., wedged between the dashboard and the windshield), the device 100 may be located at other positions within or on the vehicle 102.

The device 100 is shown including processor(s) 108 and memory 110, where the processor(s) 108 may perform various functions associated with detecting motion events 112 within the vehicle 102, and the memory 110 may store instructions executable by the processor(s) 108 to perform the operations described herein. In some instances, the device 100 employs an acceleration-based algorithm 114 and/or an image-based algorithm 116 for determining the motion events 112 and providing notification(s) 118 to a user. In some instances, whether the device 100 uses the acceleration-based algorithm 114 and/or the image-based algorithm 116 may be based on a position of a privacy cover that is configured to obstruct and unobstruct the first camera 106(1). For example, if the privacy cover obstructs the first camera 106(1), and therefore is unable to obtain image/video data 120 generated by the first camera 106(1), the device 100 may use the acceleration-based algorithm 114 to determine the motion events 112. Comparatively, if the privacy cover does not obstruct the first camera 106(1), and therefore is able to obtain image/video data 120, the device 100 may use the acceleration-based algorithm 114 and the image-based algorithm 116 to determine the motion events 112.

In some instances, the acceleration-based algorithm 114 may include multiple stages, such as a first stage and a second stage that is performed after the first stage. As will be explained herein, the first stage may correspond to a motion event candidate filtering stage that operates on accelerometer data 122 received from an accelerometer 124 of the device 100 to filter events for the second stage. At the second stage, the acceleration-based algorithm 114 performs a FFT on the accelerometer data 122 to detect the motion events 112. In this sense, the first stage may serve as a filter that detects if the accelerometer data 122 might be considered a motion event candidate 126. The second stage may be more computationally complex as compared to the first stage, to either confirm or deny the motion event candidate 126 as a motion event 112.

The accelerometer data 122 as generated by the accelerometer 124 indicates an amount of acceleration experienced by the device 100. In some instances, the accelerometer data 122 indicates an amount of acceleration experienced by the device 100 along separate axes (e.g., X, Y, and Z). In some instances, the accelerometer 124 continuously generates the accelerometer data 122, and the device 100 may determine whether the acceleration along the separate axes is greater than a threshold 128. In some instances, the device 100 generates the accelerometer data 122 in response to a mode of the device 100 (e.g., security mode) in which the device 100 senses motion and sends the notification(s) 118 to the user. For example, in response to break-ins (e.g., window), doors of the vehicle 102 opening, a person entering the vehicle 102, and so forth, the accelerometer 124 may generate the accelerometer data 122. The acceleration along each of axes (e.g., X, Y, and Z) may be compared against threshold(s) 128. In some instances, if the acceleration along any of the axes is greater than the threshold(s) 128, the device 100 may flag the acceleration as a motion event candidate 126. Therein, the device 100 may further process the accelerometer data 122, during the second stage, to either confirm the motion event candidate 126 as a motion event 112 or disaffirm the motion event candidate 126 as a motion event 112. That is, the second stage of the acceleration-based algorithm 114 may be performed based on first stage indicating the motion event candidate 126.

At the second stage, for each of the axes, the FFT may be applied to the accelerometer data 122 of time-domain data to generate three sets of frequency-domain data. In some instances, the FFT is calculated using a series of one hundred and twenty eight (128) input accelerometer values from the accelerometer data 122, over a certain period of time, for each axis. A predetermined number of the frequency values from the frequency domain data is selected and summed together. The values are summed together to obtain three values, one per axis. For example, the three sets of frequency-domain data may be for each axis, and for each axis, a predetermined number of frequency coefficients (e.g., 10%) that represent the highest magnitude frequency for a given axis, over a certain period, are selected. These magnitude frequency values may be summed for each axis to obtain three values, one for each axis, where the three values represent a sum of the largest frequency values for the accelerometer data 122 over the period of time. In other words, using the FFT, frequency-domain data may be generated for a first axis (e.g., X-axis), frequency-domain data may be generated for a second axis (e.g., Y-axis), and frequency-domain data may be generated for a third axis (e.g., Z-axis). For each axis, once values corresponding to a set of frequency bins are summed, the sum may be compared to a respective threshold 128. This is repeated for each axis. If, for all of the axes, the respective summed value is greater than the respective threshold, the motion event candidate 126 is confirmed as a motion event 112. In some instances, as the axes are related to an orientation of the device 100, each axis may have a different threshold 128, although in one or more implementations a single threshold or common threshold may be utilized. Moreover, in some instances, each of the summed values may have to be greater than their respective threshold 128 for the motion event candidate 126 to be verified. Alternatively, in some instances, if only one of the summed values (or two) is greater than their respective threshold 128, the motion event candidate 126 may be verified.

For example, the thresholds 128 to which the three values are compared may be different depending upon the axis. The value for the X-axis may be compared to a first threshold, the value for the Y-axis may be compared to a second threshold that is different than the first threshold, and/or the value for the Z-axis may be compared to a third threshold that is different than the second threshold. As such, using the acceleration-based algorithm 114, at a first stage, the device 100 may determine whether the accelerometer data 122 along any of the axes is greater than the threshold 128, and if so, at the second stage, the device 100 may perform the FFT on the accelerometer data 122, obtain three values that represent a sum of the largest frequency values for the accelerometer data 122 over the measured interval, and determine whether the values are greater than thresholds 128.

As a result of determining the motion events 112 (e.g., confirm the motion event candidates 126), the device 100 may cause the first camera 106(1) and/or the second camera 106(2) to begin generating (e.g., capturing) the image/video data 120. The image/video data 120 may be sent via a notification 118 to the user. As used herein, the user may represent an owner, operator, or user of the vehicle 102. In some instances, the notification 118 may indicate the presence of the motion event 112 and/or the image/video data 120 as captured by the first camera 106(1) and/or the second camera 106(2), respectively. For example, the device 100 may generate the notification 118 and transmit a stream of the image/video data 120 to a user device 130 (e.g., phone, tablet, laptop, etc.) of the user.

For example, as shown in FIG. 1, the device 100 may communicate with the user device 130 over one or more network(s) 132. The network(s) 132 may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. At "1" the user device 130 may display a first indication 134 of the motion event 112 (e.g., "Motion Detected!"). For example, the device 100 may transmit the notification 118 to the user device 130, and in response, the user device 130 may display the first indication 134. The first indication 134 may indicate additional information of the motion event 112 (e.g., time, location, type of motion event, and so forth). If the user desires to see the motion event 112, the user may provide an input (e.g., voice, touch, etc.) to the user device 130. For example, the user may touch on a location of the user device 130 corresponding to a display of the first indication 134. Upon receipt of the input, the user device 130 may display a second indication 136 and/or a third indication 138, which may correspond to the image/video data 120 captured by the first camera 106(1) and the image/video data 120 captured by the second camera 106(2), respectively. However, although the image/video data 120 is described as being displayed at "2", the image/video data 120 may be displayed at "1" or, may be displayed based on other inputs to the user device 130.

Up to this point, the device 100 may use only the acceleration-based algorithm 114 to determine the motion event candidate 126 and confirm the motion event candidate 126 as the motion event 112 for sending the notification 118. However, in some instances, the device 100 is configured to utilize the image-based algorithm 116 to determine the motion events 112. For example, if the privacy cover is disposed over the first camera 106(1), the device 100 is unable to record the image/video data 120 of the interior of the vehicle 102 for confirming the motion event candidates 126. In such instances, the device 100 may utilize the acceleration-based algorithm 114 for determining the presence of the motion events 112. However, if the privacy cover is in the retracted position, the device 100 may additionally or alternatively employ the image-based algorithm 116 for confirming the motion event candidates 126. As such, the process by which the device 100 carries out confirming the motion event candidates 126 may be based at least in part on a position of the privacy cover.

The image-based algorithm 116 may use the image/video data 120 as generated by the first camera 106(1). In some instances, in response to the acceleration along any of the axes being greater than the threshold 128 (i.e., the first stage of the acceleration-based algorithm 114), the device 100 may cause the first camera 106(1) to begin capturing the image/video data 120. Alternatively, in some instances, the first camera 106(1) may be activated to generate the image/video data 120 after the second stage of the acceleration-based algorithm 114. In this sense, the device 100 may use the image-based algorithm 116 after the first stage and/or the second stage of the acceleration-based algorithm 114. The image-based algorithm 116 may determine differences between consecutive frames in the image/video data 120 to confirm motion event candidate 126. In some instances, the image-based algorithm 116 may analyze consecutive frames to determine an amount of pixels that are different between the frames. By analyzing the pixels between consecutive frames, and determining that a threshold number of the pixels are different, the motion event candidate 126 may be confirmed as the motion event 112.

More specifically, as frames are captured, the frame may be compared to a previous frame by counting the number of pixels that differ by more than a threshold 128. In some instances, if the pixel values differ by more than 25-35 on a 255 scale, the pixels may be different between consecutive frames. If a threshold number of percentage of pixels between frames are different, then the frame is considered different. If there are a threshold number of frames that are identified as different, the motion event candidate 126 is confirmed as the motion event 112. In other words, if there are a threshold number of different pixels among consecutive frames, the frames are considered different, and if there are a threshold number of different frames, the motion event candidate 126 is verified. Similar to that described above, in response to the motion event candidate 126 being confirmed using the image-based algorithm 116, the device 100 may cause the notification 118 to be sent to the user device 130 for providing a stream of the image/video data 120 of the first camera 106(1) and the second camera 106(2), respectively. If the privacy cover is disposed over the first camera 106(1), the notification 118 may only include the image/video data of the second camera 106(2).

In some instances, the amount or duration of the frames used to verify the motion event candidates 126 may be greater than a certain time period. For example, in some instances, 1.2 seconds worth of frames may be compared to one another to determine the differences therebetween and whether the motion event candidate 126 is verified. However, other time periods are envisioned. For example, 5.0 seconds worth of frames may be compared to one another to determine the differences therebetween and whether the motion event candidate 126 is verified. However, in some instances, the device 100 may confirm the motion event candidate 126 within a certain period of time after capturing the image/video data 120 from the first camera 106(1). In some instances, if a threshold amount of time lapses without the motion event candidate 126 being confirmed, the motion event candidate 126 may not be confirmed (e.g., timed out). In response, the notification 118 may not be sent to the user device 130.

In some instances, the image-based algorithm 116 is configured to only analyze a motion zone 140 of the image/video data 120. For example, certain portions of the image/video data 120 may include the interior of the vehicle 102, while other portions of the image/video data 120 may include the exterior of the vehicle 102 (e.g., exterior to the windows). That is, being as the first camera 106(1) is oriented towards the interior of the vehicle 102, the image/video data 120 may capture portions of the environment external to the vehicle 102. To avoid detecting the motion outside of the vehicle 102, the device 100 may only analyze the motion zone 140 of the image/video data 120 that is within the vehicle 102. For example, to avoid detecting pedestrians, vehicles, or other objects moving in proximity to the vehicle 102, portions of the image/video data 120 that include windows may be omitted. Given the placement of the device 100 in the interior, the motion zone 140 may be a bottom area of the frame that includes the interior of the vehicle 102 without the windows. The motion zone 140 may be applied as a mask to the image/video data 120, and thereafter, the pixels within the mask may be analyzed by the image-based algorithm 116 for confirming the motion event candidate 126.

In some instances, the motion zone 140 may be selected by default, for example, by determining an average motion zone across a dataset (e.g., different vehicles). For example, the motion zone 140 may be default and based on a historical layout of windows, dashboards, and so forth of vehicles. In some instances, the motion zone 140 may be programmable based on the type, make, and/or model of the vehicle 102. Still, in some instances, the motion zone 140 may be programmable via the user, for example. That is, the user of the device 100 may set the motion zone 140. In some instances, the motion zone 140 may be updated based on newer datasets, an analysis to determine features (e.g., windows) for automatically locating the motion zone 140, pixel weighting (e.g., those pixels located more distant from windows, or in a center of the portion), and so forth. For example, using the image/video data 120 generated by the first camera 106(1), the motion zone 140 may be automatically determined by identifying edges, lines, features, and so forth within the vehicle 102. Therein, the device 100 may use this motion zone 140 to determine the differences between consecutive frames.

In addition to the camera(s) 106 and the accelerometer(s) 124, the sensor(s) 104 of the device 100 may include microphone(s), gyroscope(s), microwave proximity sensor(s) (MPS), infrared detector(s), and so forth. The sensor(s) 104 respectively generate sensor data 142, such as the accelerometer data 122 and the image/video data 120, as well as other data (e.g., audio data). In some instances, the sensitivities for detecting and/or confirming the motion events 112 may be configurable. For example, the user may define the threshold 128 used by the acceleration-based algorithm 114 to detect motion event candidates 126 and/or the motion events 112. As another example, the user may define the thresholds 128 used to determine the percent difference between pixels of consecutive frames, or the amount, number, or percentage of frames that have to be different for confirming the motion event candidate 126.

In some instances, the device 100 communicates with remote computing resource(s) 144, which may be located remotely from the device 100. In some instances, the remote computing resource(s) 144 stores the sensor data 142 as received from the device 100, for example, for providing access to the notification(s) 118. Storing the sensor data 142, for example, permits the user to access the sensor data 142

(e.g., the image/video data 120) at later instances in time. The remote computing resource(s) 144 may also store the notification(s) 118 to provide a database of notification(s) 118 generated by the device 100. Still, in some instances, the remote computing resource(s) 144 may detect motion event candidate(s) 126 and/or confirm the motion event(s) 112. The remote computing resource(s) 144 may also be responsible for causing the notification(s) 118 (including the image/video data 120) to be sent to the user device 130.

In some instances, the remote computing resource(s) 144 may be implemented as one or more servers and may, in some instances form a portion of a network-accessible computing platform implemented as a computing infrastructure of processors, storage, software, data access, and so forth that is maintained and accessible via the network 132 such as the Internet. Cloud-based systems may not require end-user knowledge of the physical location and configuration of the system that delivers the services. Common expressions associated for the remote computing resource(s) 144 include "on-demand computing", "software as a service (SaaS)", "platform computing", "network-accessible platform", "cloud services", "data centers", and so forth.

In some instances, the user of the device 100 may configure sensitives of the device 100. For example, the user may lower thresholds 128 used by the acceleration-based algorithm 114 and/or the image-based algorithm 116 for being notified of an increased number of the motion events 112 (e.g., as compared to heightening the thresholds). Moreover, the user may define the threshold 128 used by the acceleration-based algorithm 114 and/or the image-based algorithm 116 based on the position of the privacy cover. Still, in some instances, the thresholds 128 used by the acceleration-based algorithm 114 and/or the image-based algorithm 116 may be programmatically set based on whether the image/video data 120 is used to confirm the motion event candidates 126. For example, if the image-based algorithm 116 is used to confirm the motion event candidates 126, lower thresholds may be used during the first stage of the acceleration-based algorithm 114. Comparatively, if the image-based algorithm 116 is not used to confirm the motion events 112, the first stage and/or the second stage of the acceleration-based algorithm 114 may have heightened threshold being as the image-based algorithm 116 will be unable to filter out false positive motion events 112.

The device 100 includes network interface(s) 146 for communicatively coupling with the user device 130 and/or the remote computing resource(s) 144. The network interface(s) 146 permit the device 100 to communicate over the one or more network(s) 132, such as Wi-Fi, LORA, Bluetooth, ZigBee, Bluetooth Low Energy (BLE), LTE, and so forth. In some instances, the network interface(s) 146 of the device 100 includes one or more wireless radios. In some instances, the device 100 includes a wireless radio configured to transmit and receive sub-GHz signals (e.g., at or around 900 MHZ). In some instances, the device 100 includes electronic components, circuitry, and/or software configured to modulate and demodulate signals in a variety of formats.

In some instances, the device 100 includes a battery 148, such as a rechargeable Lithium-ion battery, for storing energy that is used by the device 100 when the vehicle 102 is not in use (e.g., to monitor for the motion event(s) 112). The battery 148 may be charged and/or store energy while the vehicle 102 is in use via power received from an onboard diagnostic (OBD) port and connection with the vehicle 102. Although the device 100 is shown including the battery 148, in some instances, the battery 148 may be omitted and the device 100 may be charged via a battery of the vehicle, for example, and/or a supercapicator.

Although the device 100 is shown including certain components, the device 100 may include additional or alternative components. In some instances, the device 100 may include components such as those described in U.S. patent application Ser. No. 17/955,281, filed Sep. 28, 2022, and entitled "Security Camera Device for Vehicles." This patent application, as well as any publications thereof or patents issuing therefrom, are hereby incorporated herein by reference.

As used herein, a processor, such as the processor(s) 108 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory 110 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 2A:
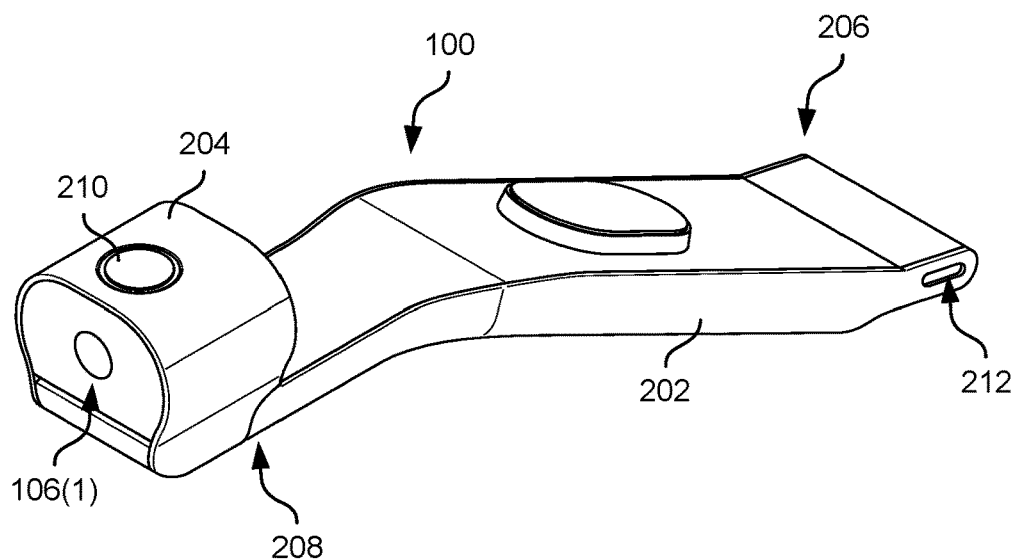
FIGS. 2A and 2B illustrate perspective views of the device of FIG. 1, according to an example of the present disclosure.
Figure 2B:
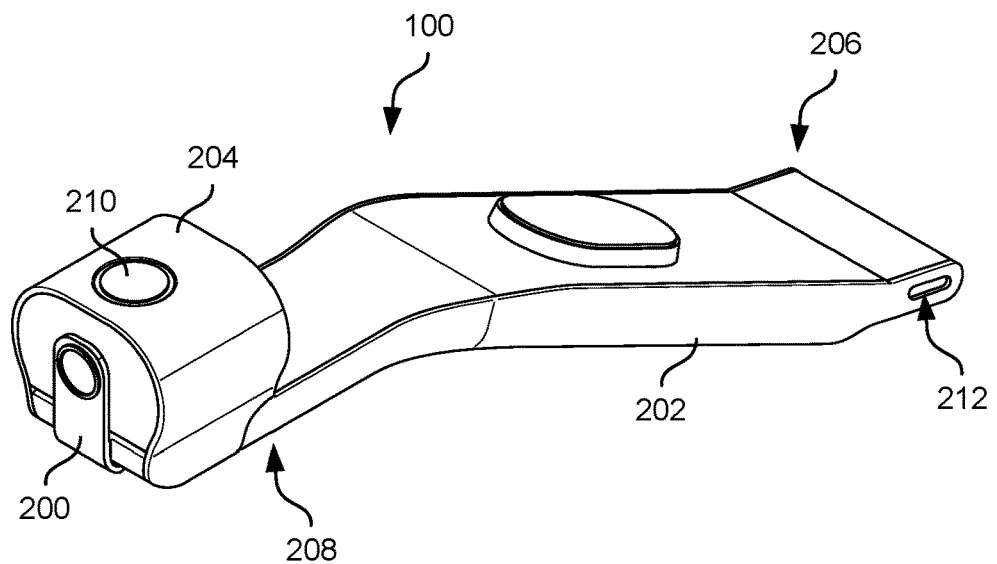

FIGS. 2A and 2B illustrate a privacy cover 200 of the device 100 being disposed in different positions, according to examples of the present disclosure. In FIG. 2A, the privacy cover 200 is in a retracted position, so as not obstruct the first camera 106(1) of the device 100, and in FIG. 2B, the privacy cover 200 is in an extended position so as to obstruct the first camera 106(1) of the device 100.

The device 100 may include a body 202 and a head 204 pivotably coupled to the body 202. The body 202 may include a first end 206 and a second end 208 (e.g., spaced apart in the Z-direction). In some instances, the first end 206 may represent a toe of the body 202 that wedges between a dashboard and a windshield of the vehicle 102 in which the device 100 resides. The second end 208 may represent a neck that pivotably couples to (e.g., receives) the head 204. As such, when the first end 206 of the body 202 wedges into a space between the dashboard and the windshield, the head 204 may be disposed away from the windshield of the vehicle 102. The body 202 therefore serves to extend the head 204 into the interior (e.g., cabin) of the vehicle 102.

The head 204 includes a button 210 and the first camera 106(1). The button 210 may be located on a top of the head 204, while the first camera 106(1) (or a lens of the first camera 106(1)) may be located on a front of the head 204, opposite a back (e.g., spaced apart in the Z-direction) of the head 204. When the device 100 is disposed in the vehicle 102, the front is oriented towards an interior (e.g., cabin) of the vehicle 102 in order to capture the image/video data 120 of the interior of the vehicle 102, while the button 210 may be oriented towards a ceiling and/or the windshield of the vehicle 102. As such, in some instances, the first camera 106(1) may be considered an interior facing camera.

The head 204 pivotably couples to the second end 208 of the body 202. The head 204 may be configured to rotate about one or more axes (e.g., about the X-axis). In some instances, the coupling between the head 204 and the body 202 represents a hinged connection, however, a ball joint or other type connections may pivotably couple the head 204 and the body 202. The pivotable nature of the head 204 may adjust a FoV, orientation, and so forth of the first camera 106(1).

The privacy cover 200 may rotate between the retracted position (in FIG. 2A) to the extended position (in FIG. 2B) to occlude the first camera 106(1). In some instances, the privacy cover 200 rotates from a position adjacent to a bottom of the head 204 (e.g., about the X-axis). The privacy cover 200 occludes the first camera 106(1) and restricts the first camera 106(1) capturing the image/video data 120 of the interior of the vehicle 102. In some instances, when disposed over the first camera 106(1), the privacy cover 200 also causes a switch (e.g., hall effect sensor) to deactivate (e.g., turn off) the first camera 106(1). For example, a magnetic element may be disposed in the privacy cover 200, and based on the hall effect sensor detecting the magnetic field, the first camera 106(1) may be deactivated. The hall effect sensor may be disposed on the front of the head 204.

In some instances, the device 100 is configured to utilize the position of the privacy cover 200 for detecting the motion events 112 in the vehicle 102. For example, when the privacy cover 200 is in the retracted position, the device 100 may use the acceleration-based algorithm 114 (e.g., first stage) and the image-based algorithm 116 for determining the motion event candidates 126 and confirming the motion event candidates 126, respectively. When the privacy cover 200 is in the extended position, the device 100 may use the acceleration-based algorithm 114 (e.g., first stage and second stage) for determining motion event candidates 126 and confirming the motion event candidates 126. That is, because the privacy cover 200 is disposed over the first camera 106(1), the device 100 may not employ the image-based algorithm 116 to confirm the motion event candidates 126. In some instances, the device 100 receives the sensor data 142 from the switch for determining the position of the privacy cover 200, and subsequently, how to determine the motion event candidates 126 and/or confirm the motion event candidates 126 (via the acceleration-based algorithm 114 and/or via the image-based algorithm 116). The device 100 may also have a port 212 for powering the device 100.

Figure 3A:
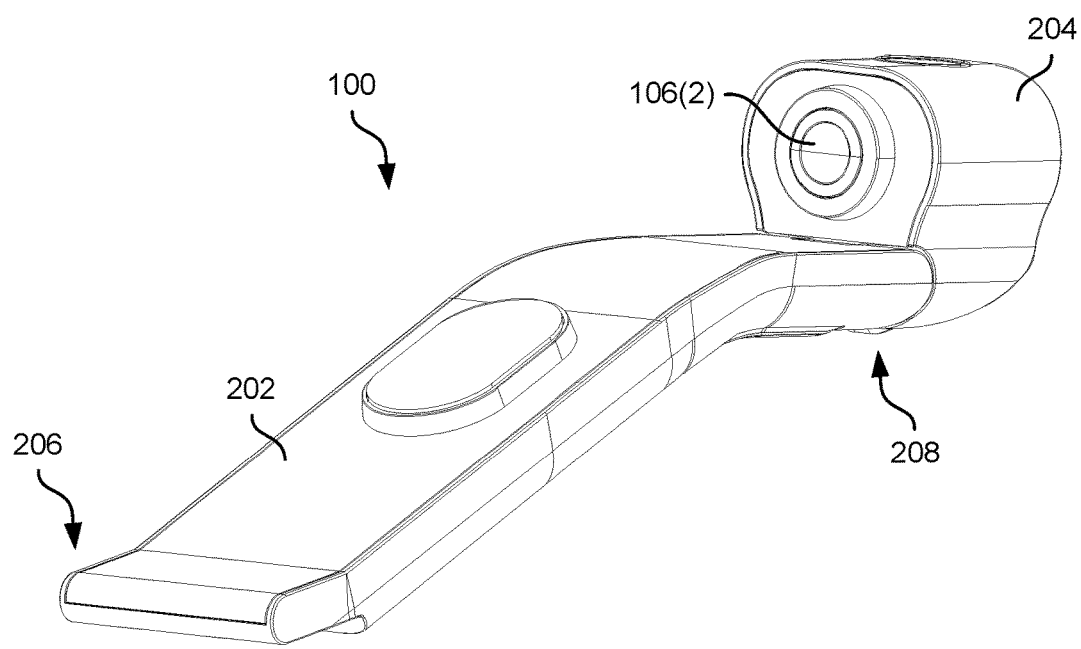
FIGS. 3A and 3B illustrate an example operation of a privacy cover of the device of FIG. 1, according to an example of the present disclosure.
Figure 3B:
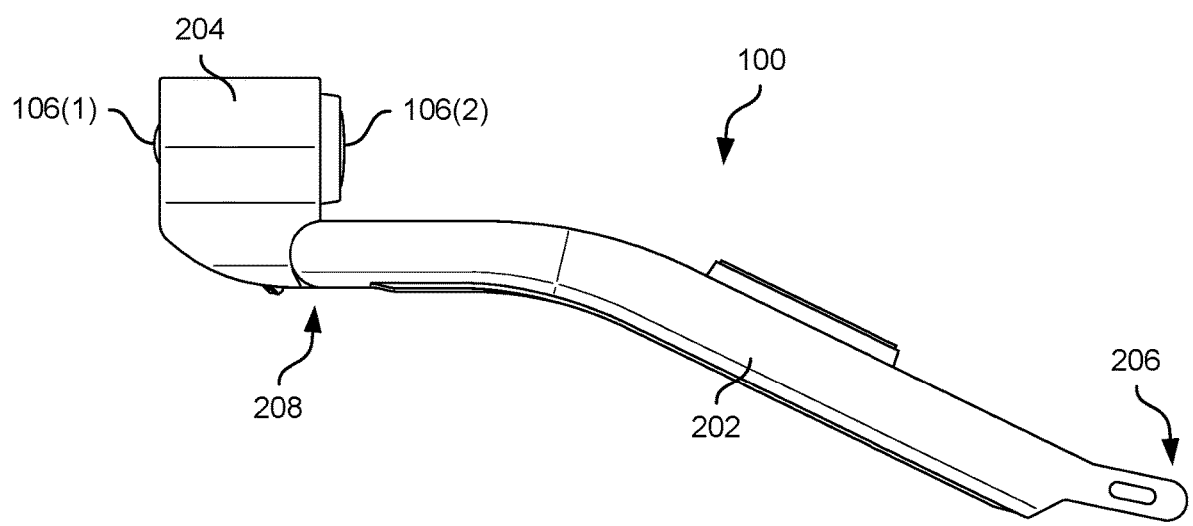
Figure 4A:
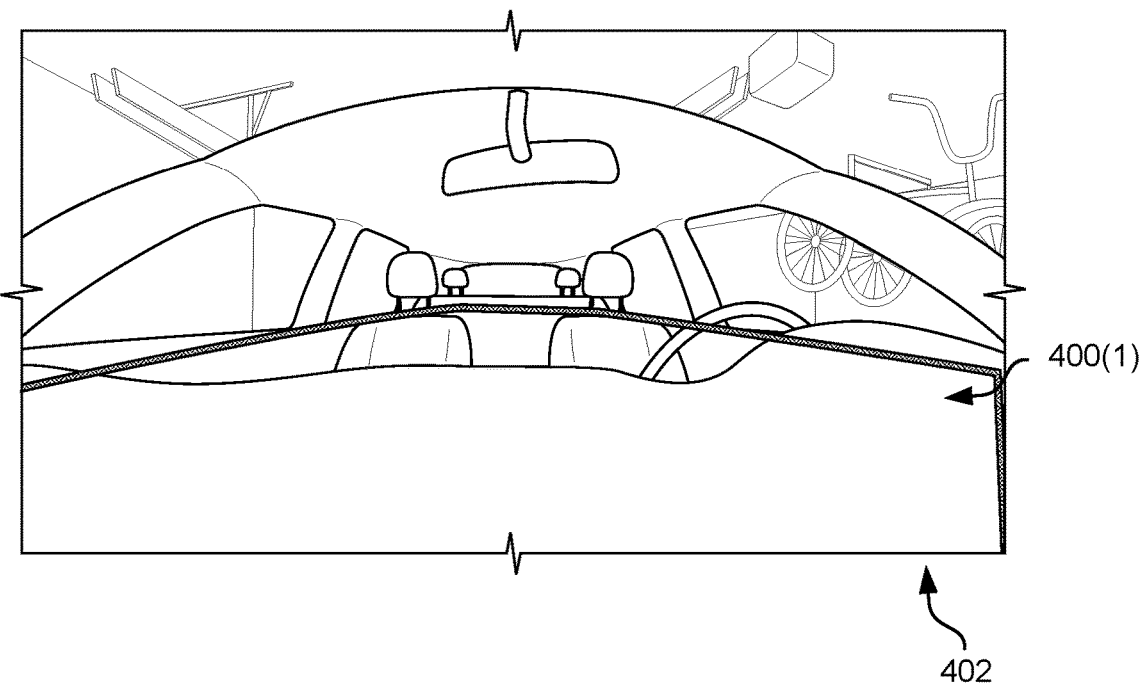
FIGS. 4A-4D illustrate example motion zones of the device of FIG. 1 for detecting motion within a vehicle, according to an example of the present disclosure.
Figure 4B:
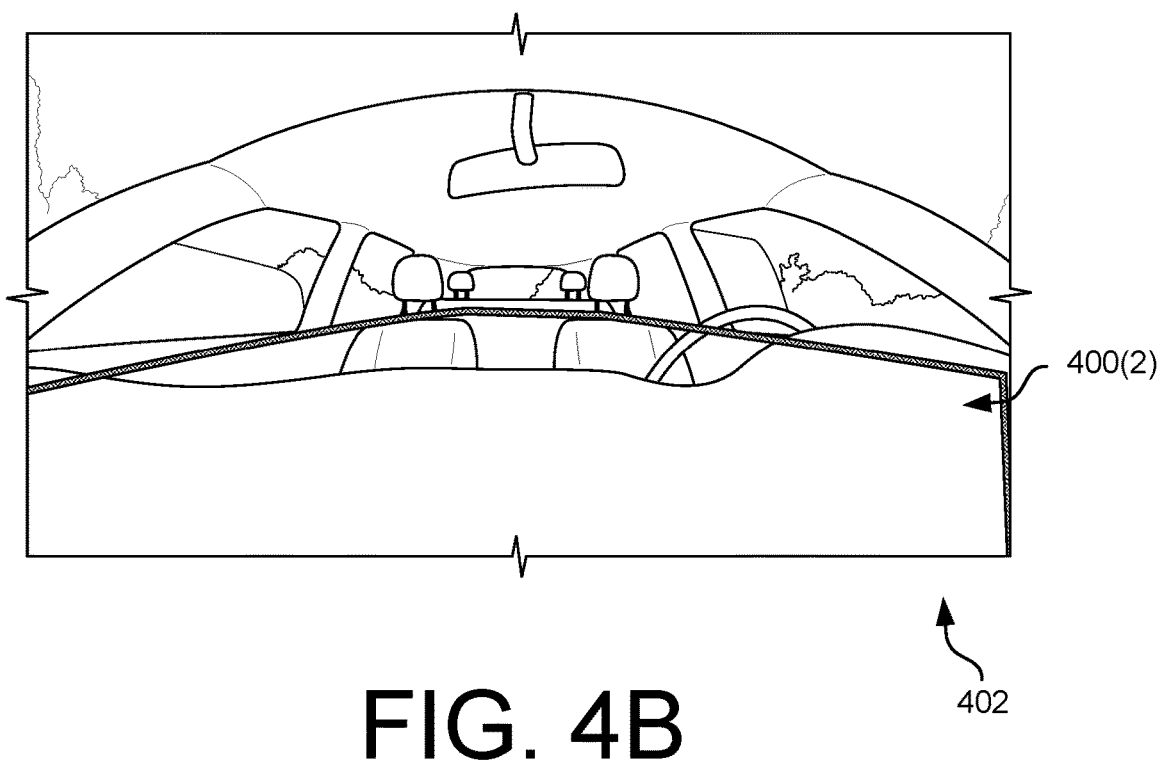
Figure 4C:
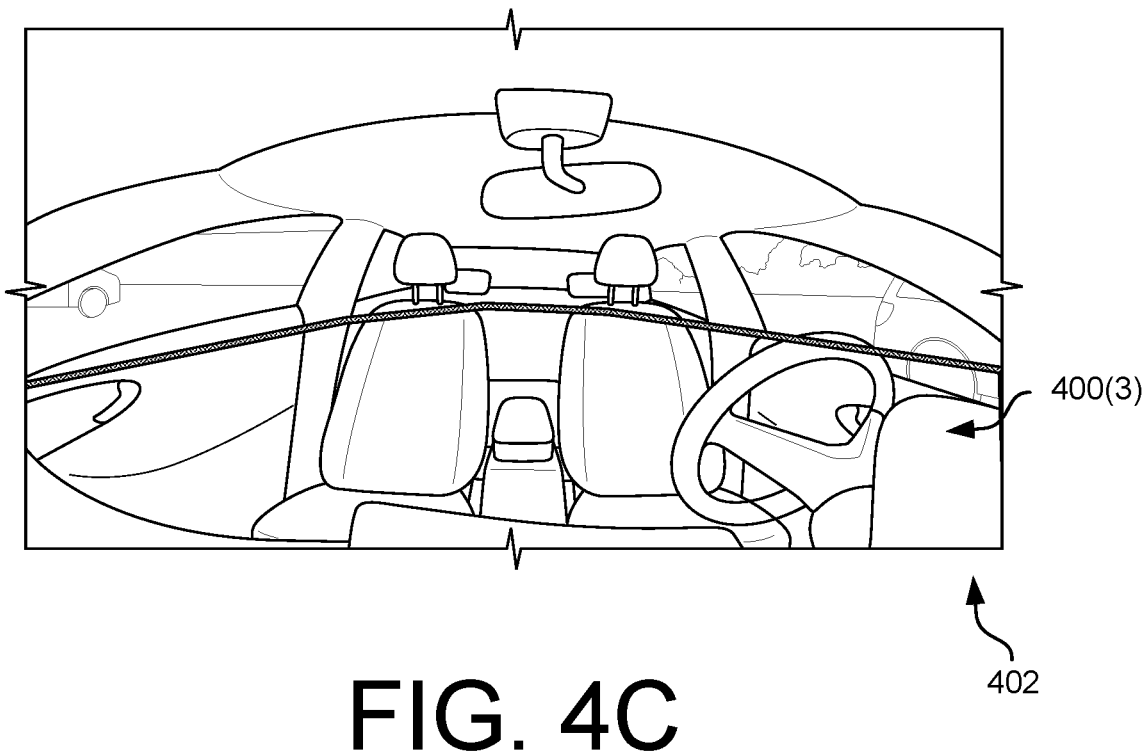
Figure 4D:
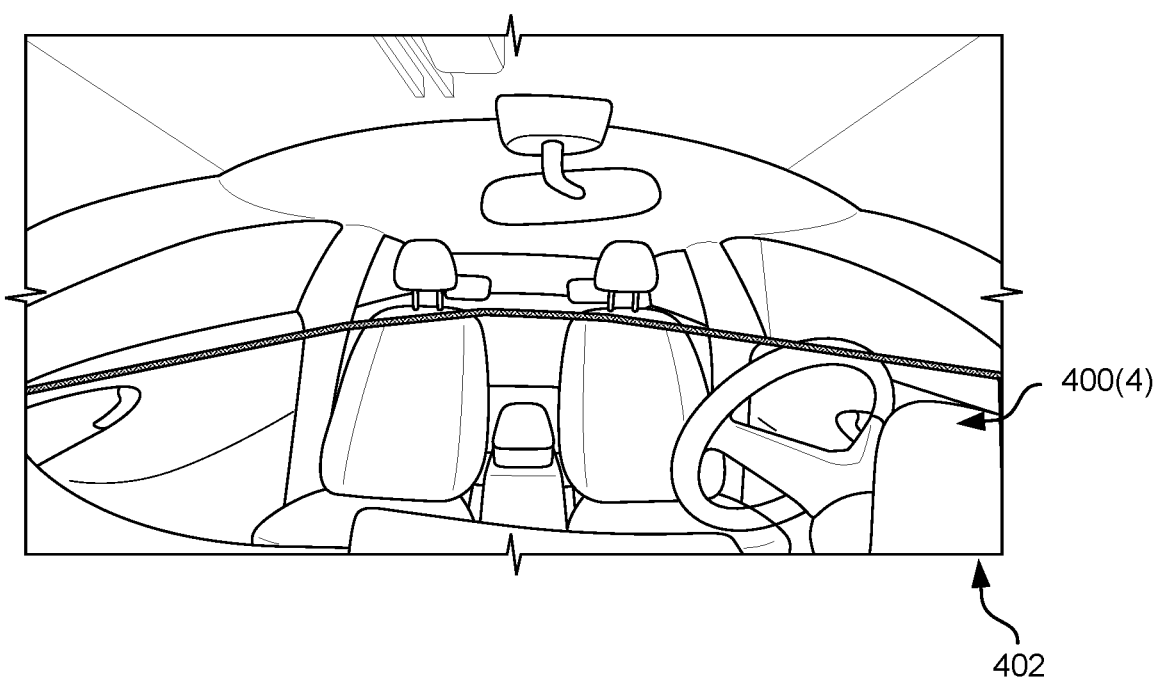

FIGS. 3A and 3B illustrate various side views of the device 100, according to examples of the present disclosure. The head 204 has back, opposite the front (e.g., spaced apart in the Z-direction), that includes the second camera 106(2) (or a lens of the second camera 106(2)). The second camera 106(2) may represent an exterior facing camera that captures an environment of the vehicle 102. For example, the second camera 106(2) may be forward facing, relative to a direction of travel of the vehicle 102, to capture an environment in front of the vehicle 102. The pivotable nature of the head 204 may adjust a field of view, orientation, and so forth of the second camera 106(2) (in addition to the first camera 106(1)). The second camera 106(2) is configured to capture image/video data 120 through the windshield of the vehicle 102.

In some instances, the body 202 may include a curved profile, from the first end 206 to the second end 208, so as to extend the head 204 away from the windshield and the dashboard in a first direction (e.g., Z-direction) as well as to extend the head 204 away from the dashboard in a second direction (Y-direction). For example, the body 202 may include a slightly "S-shaped" curvature along the length of the body 202. In some instances, the curve may be approximately twenty-four degrees with respect to a lengthwise axis of a portion of the body 202 proximate the first end 206.

FIGS. 4A-4D illustrate example motion zones 400(1)-(4) within the vehicle 102, according to examples of the present disclosure. In some instances, the motion zones 400(1)-(4) are used to determine a default motion zone applied as a mask to the image/video data 120 for determining whether motion is detected in the vehicle 102. For example, each of the motion zones 400(1)-(4) in FIG. 4A-4D may be part of a dataset that is used to determine the default motion zone for applying to the image/video data 120. The motion zones 400(1)-(4) represent a portion of a field of view of the first camera 106(1) (e.g., less than an entirety of the field of view) that is applied as a mask to the image/video data 120 for determining a difference in pixels.

As shown, and in some instances, the motion zones 400(1)-(4) may be arranged proximate to a bottom 402 of the image/video data 120 that at least partially includes a dashboard of the vehicle 102. The bottom 402 may be a bottom of a portion of a field of view of the first camera 106(1). Additionally, the motion zones 400(1)-(4) may be disposed below the windows. For example, the motion zones 400(1)-(4) may omit side windows (e.g., front passenger window, driver's window) and/or a back window. In doing so, motion external to the vehicle 102 may not be included within the motion zones 400(1)-(4). In other words, if the motion zones 400(1)-(4) were extended to include the windows, motion may be detected outside the vehicle 102 and the notification(s) 118 may be sent to the user even though motion was not detected within the vehicle 102. For example, if the motion zones 400(1)-(4) included the window, a pedestrian walking by the vehicle 102, outside the vehicle 102, may be detected as motion for purposes of issuing the notification 118. Accordingly, by eliminating the windows from the motion zone 140, this may reduce a number of irrelevant notification(s) 118 the user receives and video recordings that are recorded and stored, thereby reducing a power consumption of the device 100.

As such, in some instances, using the motion zones 400(1)-(4), a default motion may be determined for the device 100, and the default motion zone may be applied to the image/video data 120 to determine whether the image/ video data 120 contains the motion event 112. In some instances, the motion zones 400(1)-(4) may be widen or narrowed by a percentage (e.g., 5%, 10%, etc.) to account for any variances and to accurately sense motion events 112. The motion zones 400(1)-(4) are exemplary, and other motions may be used to determine the default motion zone. Further, in some instances, the motion zone 140 may be modified by the user to fit or otherwise confirm to their specific vehicle 102. Additionally, as will be explained herein, the motion zone 140 may be automatically determined by the device 100 based on processing the image/video data 120.

FIGS. 5A-5E illustrates a canny edge detector for use in identifying edges or lines the image/video data 120, according to examples of the present disclosure. In some instances, an image is first converted to grayscale, and then an edge detection algorithm is utilized, such as a Canny edge detection algorithm (e.g. the cv.Canny( ) function of OpenCV).

In some instances, after being converted to grayscale, a threshold is utilized to convert a grayscale image to a binary or two-tone image, such a black and white image having value 0 (e.g. corresponding to black) or 1 (e.g. corresponding to white). In a simplistic approach, for example, considering grayscale pixel values between 0 and 255, any pixel values 122 or higher might result in a binary pixel value of 1, while any pixel values below 122 might result in a binary pixel value of 0. In some instances, a dynamic thresholding algorithm is used to utilize a dynamic threshold for a pixel or portion of an image based on attributes of the image or portions of the image (e.g. portions of the image surrounding a particular pixel). To facilitate edge detection, a Gaussian filter is applied to smooth noise from the image.

In some instances, for edge detection, a Sobel operator is used for the denoised image to generate one or more image derivatives (e.g., using a 3×3 Sobel x-filter (or kernel) convolved with the image to generate an x-image-derivative), and using a 3×3 Sobel y-filter convolved with the image to generate a y-image-derivative. In some instances, the occurs as part of executing a Canny edge detection algorithm.

Figure 5A:
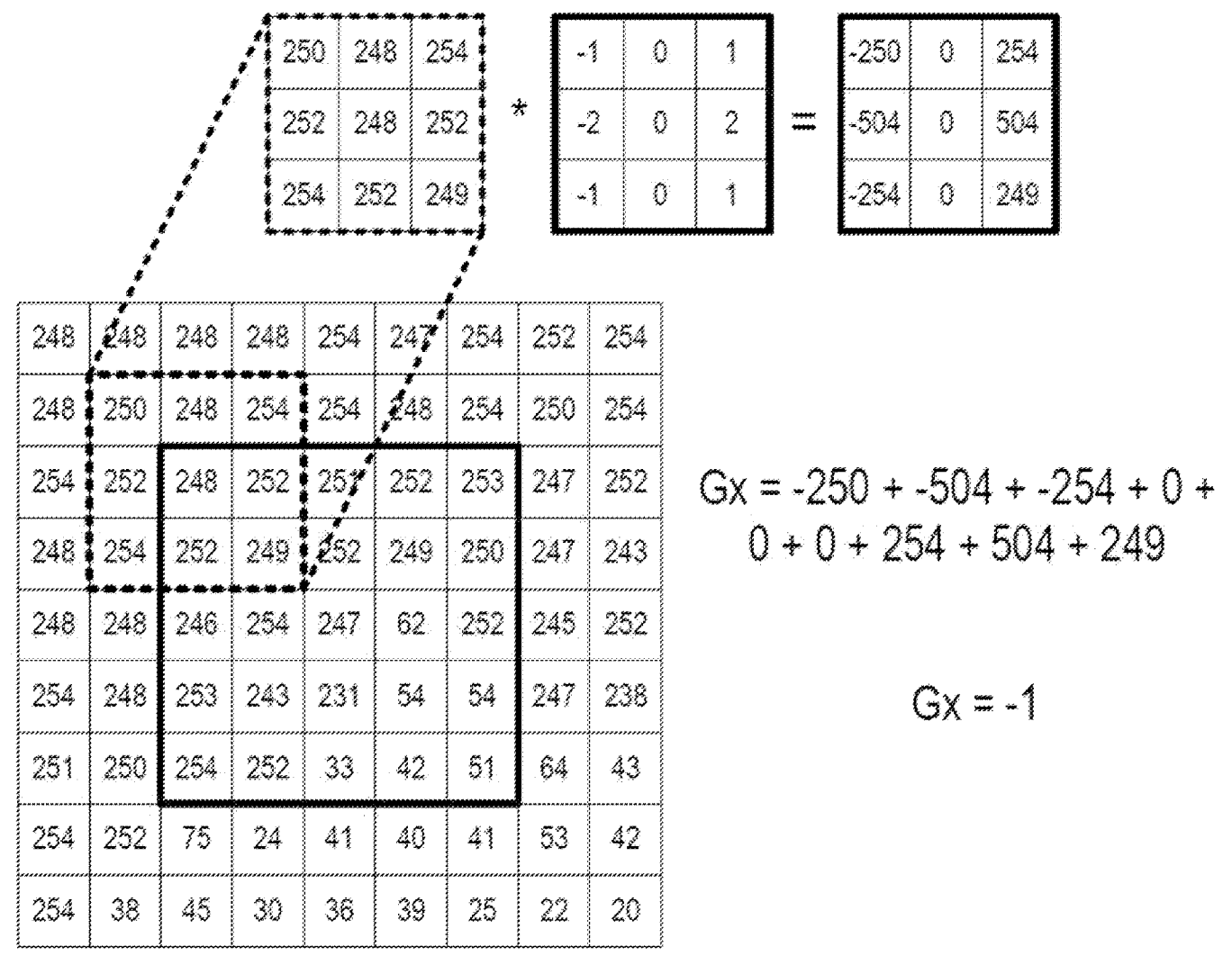
Figure 5B:
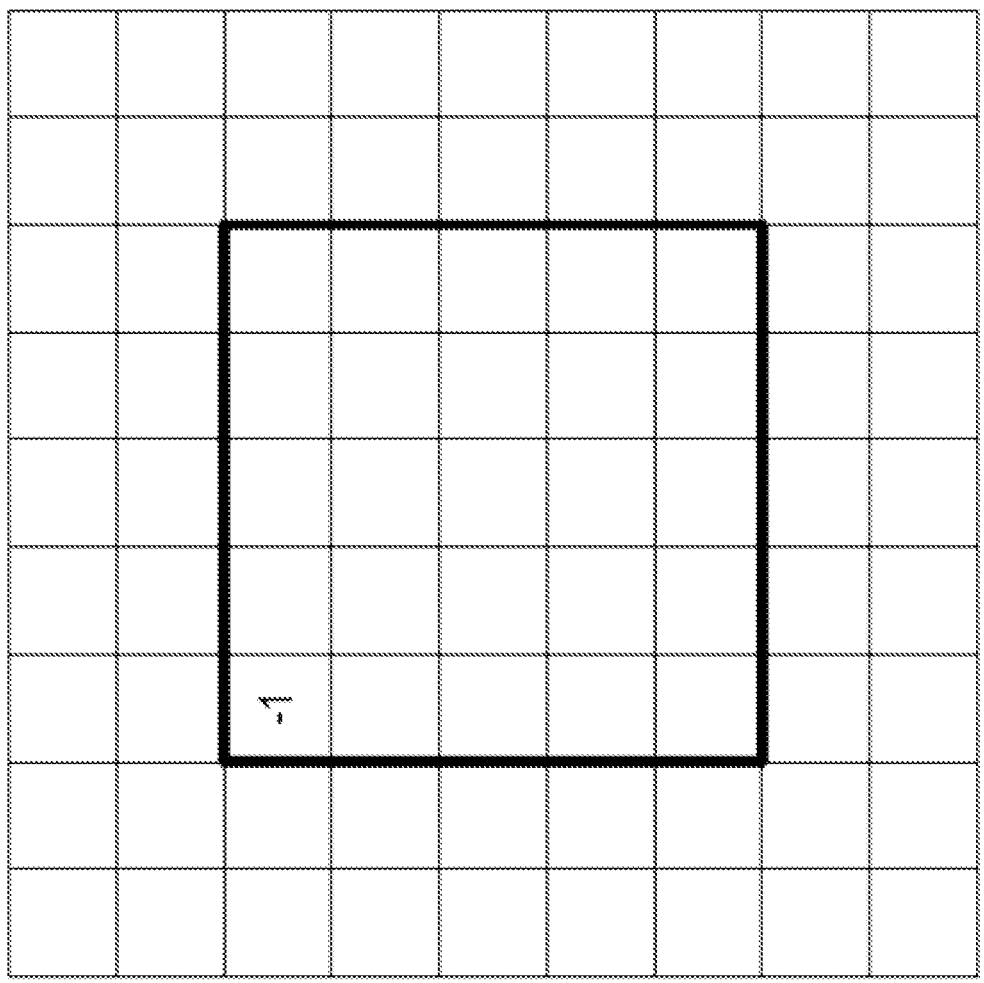
Figure 5D:
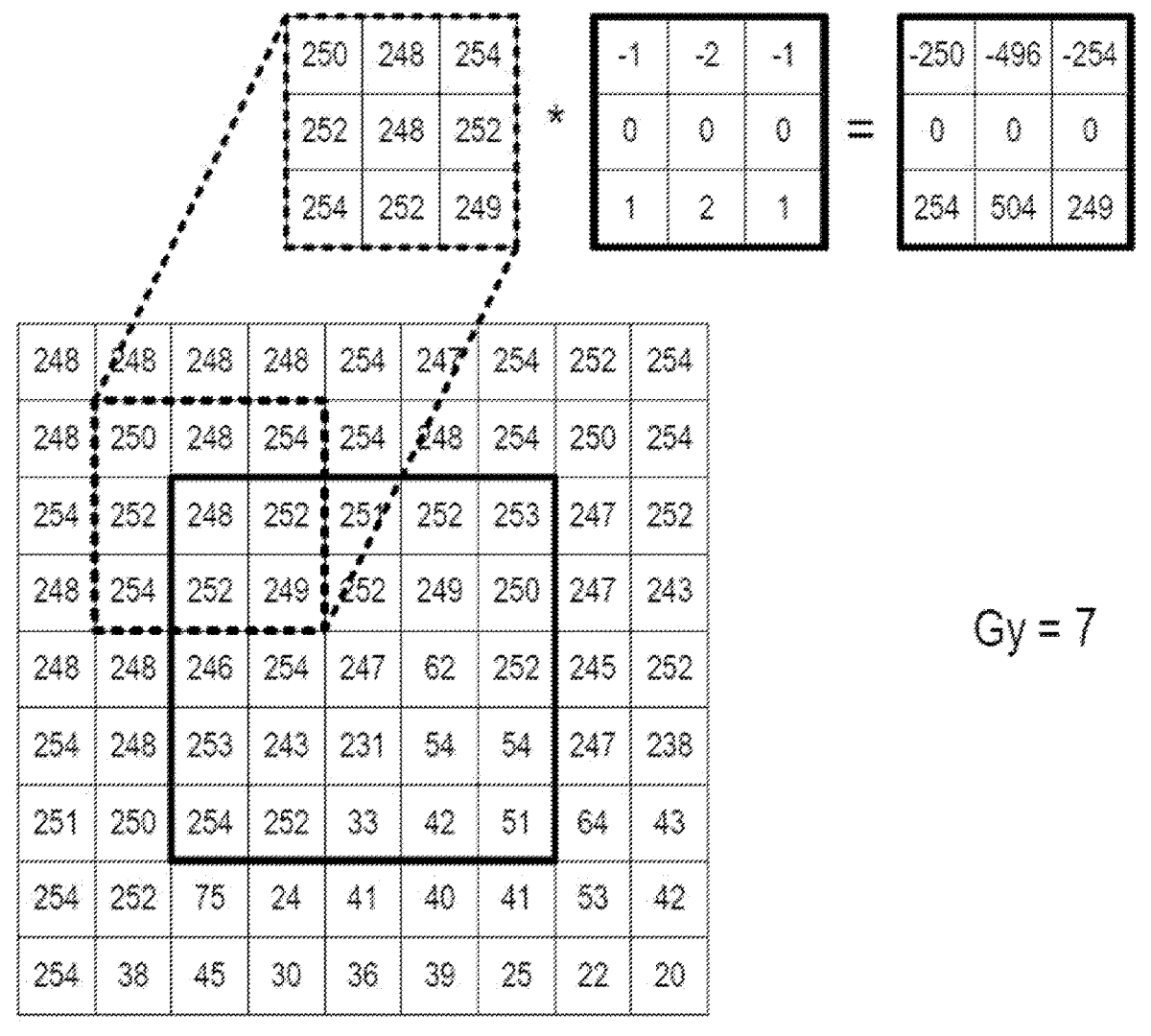

For example, FIGS. 5A and 5B illustrate a determination of a x-image derivative using a 3×3 Sobel x-filter for a pixel at location (3,3) in the illustrated set of pixel values. FIG. 5C illustrates calculated x-image derivatives for a plurality of pixel locations. FIG. 5D illustrates a determination of a y-image derivative using a 3×3 Sobel y-filter for a pixel at location (3,3) in the illustrated set of pixel values, and FIG. 5E illustrates calculated x-image derivatives and y-image derivatives for a plurality of pixel locations.

For each pixel location, an edge gradient magnitude and direction may be determined based on a chosen function. For example, an edge gradient magnitude may be defined for a given pixel (x,y) as $sqrt(Gx(x,y)^2+Gy(x,y)^2)$, and edge gradient direction may be determined for a given pixel (x,y) as $tan^-1(Gy(x,y)/Gx(x,y))$. Using these determined edge gradient magnitudes and edge gradient directions, some pixel values may be suppressed (reduced to zero) if it is determined that they are not a local maximum in its neighborhood in the direction of the gradient.

Subsequently, hysteresis thresholding may be utilized with a first threshold and a second threshold, where any pixels having an adjusted edge gradient value greater than the second threshold are automatically identified as an edge, while any pixels having an adjusted edge gradient value less than the first threshold are automatically identified as not being an edge. Pixels having an adjusted edge gradient value between the first threshold and the second threshold are evaluated to determine whether they are connected to a pixel that has been identified as an edge. If not, they are discarded (e.g., set to zero). The result is a set of pixel values for the image indicating whether each corresponding pixel is an edge or not.

Figure 6:
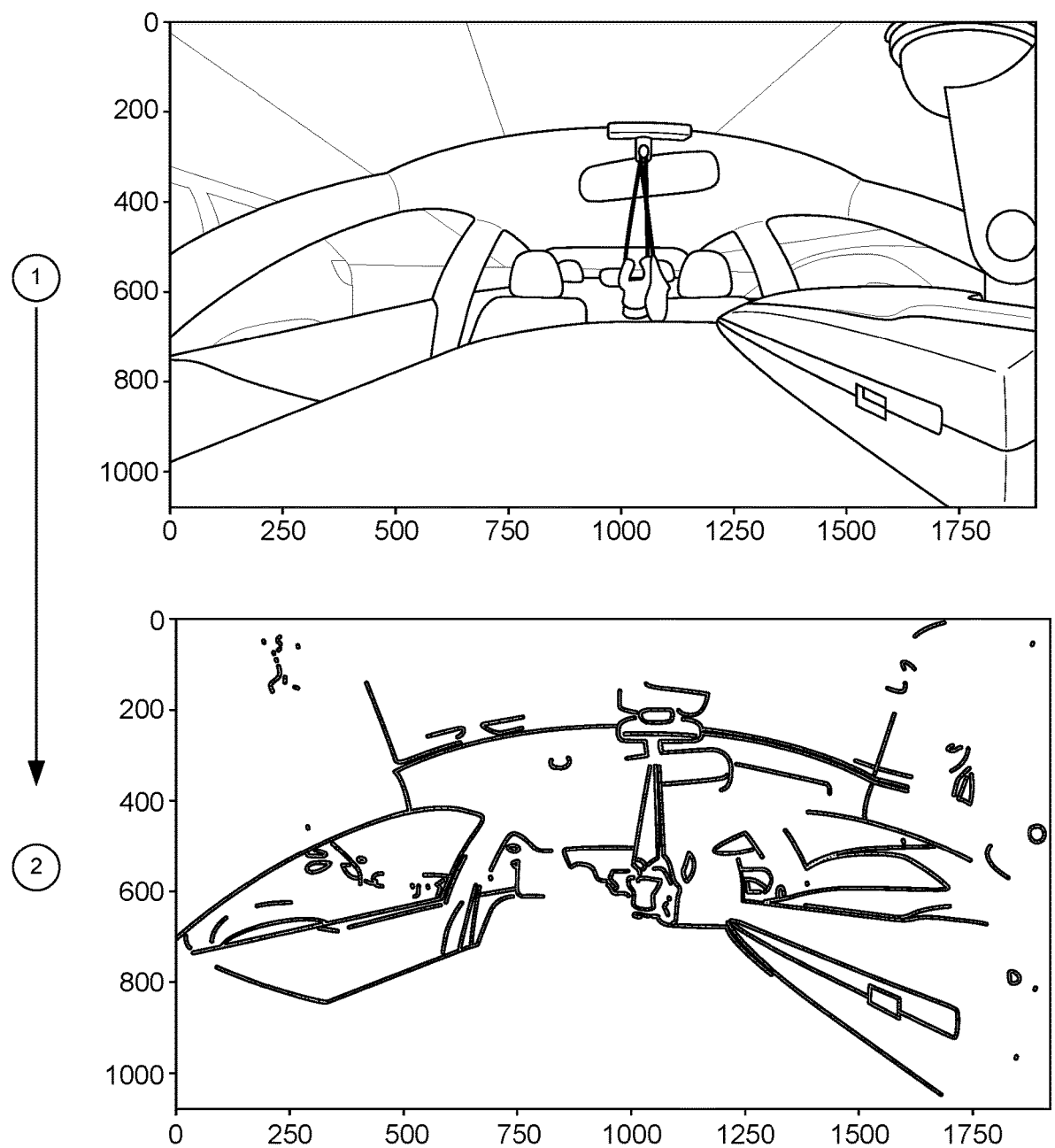
FIGS. 6-8 illustrate an example scenario for detecting a motion zone of the device of FIG. 1, according to an example of the present disclosure.
Figure 7:
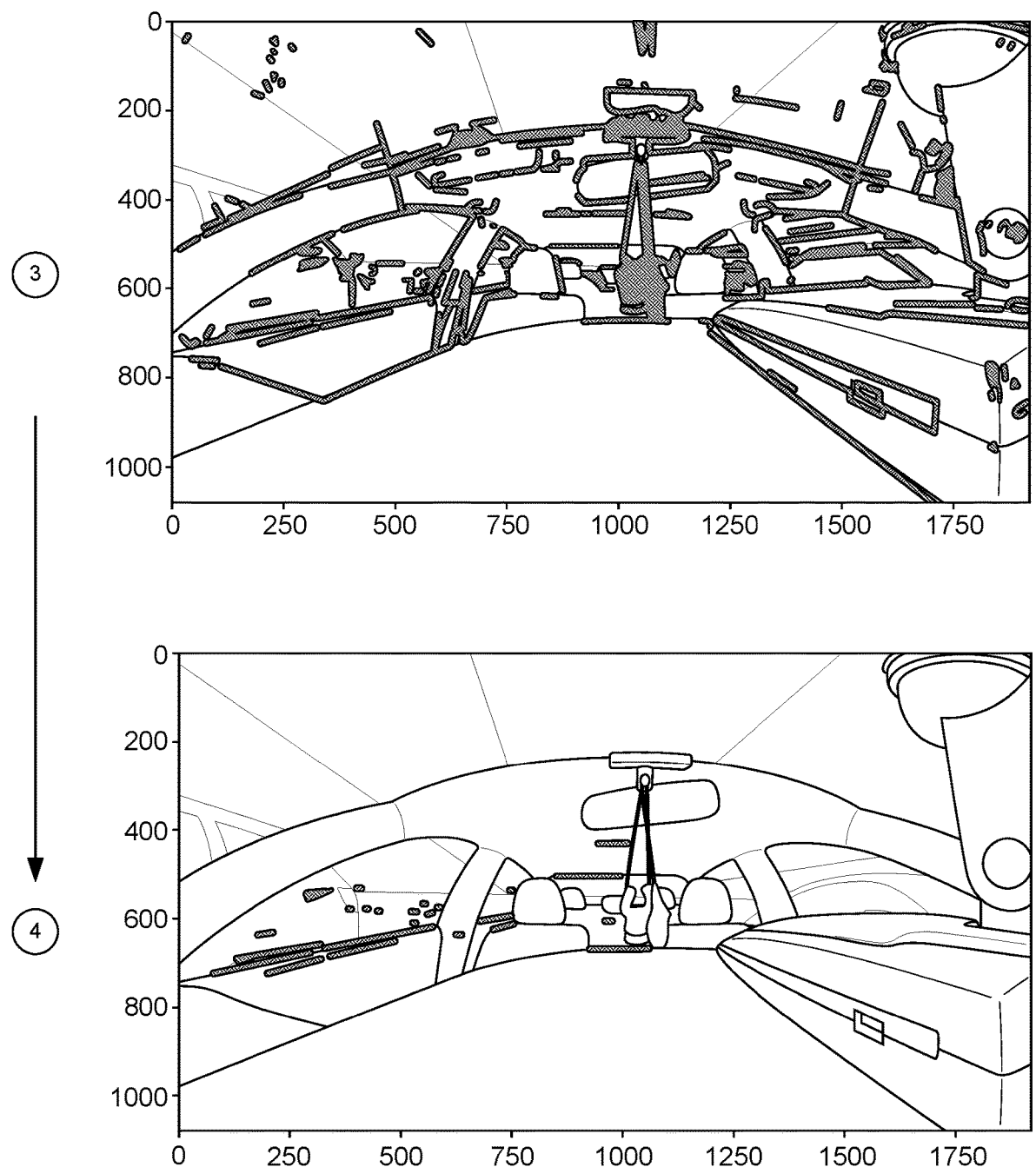
Figure 8:
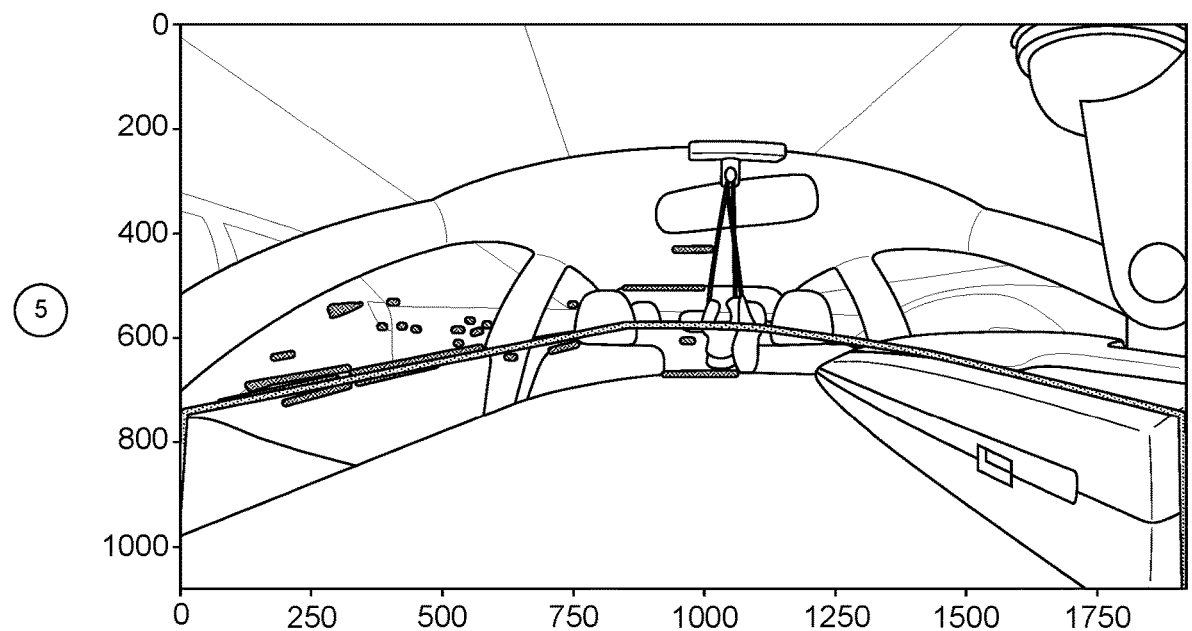

FIGS. 6-8 illustrates a sequence of operations for automatically detecting motion zones 140, for example, according to examples of the present disclosure. In some instances, the device 100 may have a default motion zone 140. In this instance, the motion zone 140 across the devices 100 may be the same, regardless of the placement of the device 100 within the vehicle 102. However, using the default motion zone 140 may result in detecting motion external to the vehicle 102 (e.g., through windows). Having a motion zone 140 that is variable may account for the different placements, orientations, and so forth of the device 100.

Initially, at "1" in FIG. 6 the device 100 may capture image/video data 120 within the interior of the vehicle 102. The image/video data 120 may be captured by the first camera 106(1). A line detection algorithm may take the image/video data 120 and convert the image/video data 120 into black and white (or grayscale). The line detection algorithm may then blur the black and white image to make minor lines, or less prominent lines, less detectable. In some instances, blurring the minor lines may include applying a Gaussian blur.

After blurring the black and white image, at "2" in FIG. 6 lines may be detected using a canny edge detection algorithm, such as the canny edge detection algorithm described above in FIGS. 5A-5F. In some instances, the canny edge detection algorithm may have multiple stages such as image smoothing, differentiation, and non-maximum suppression. After applying the canny edge detection algorithm, lines may be detected using a Hough line transformation algorithm. For example, the Hough line transformation algorithm may be used to locate edges placed as straight lines. In some instances, instead of using the canny edge detection algorithm and/or Hough line transformation algorithm, a line segment detection algorithm may be used.

A line in an image space can be expressed in a Cartesian coordinate system based on a slope and an intercept, or in a polar coordinate system based on a radius or distance r and an angle theta. Using a polar coordinate system, a line equation can be formulated as y=(−cos theta/sin theta) x+(r/sin theta), or r=x cos theta+y sin theta. Generally, for each point (x0, y0), it is possible to define a family of lines that goes through that point as rtheta=x0*cos theta+y0*sin theta. This means that each pair (rtheta, theta) represents each line that passes by (x0, y0). For a given (x0, y0), plotting the family of lines that goes through it produces a sinusoid. This operation can be carried out for all the points in an image. If the curves of two different points intersect in the plane θ−r, that indicates that both points belong to a same line. For example, the points (x0=8, y0=6) (x1=4, y1=9), and (x2=12, y2=3), when plotted, intersect at (0.925, 9.6), which are the coordinates (theta, r) for the line in which (x0, y0), (x1, y1), and (x2, y2) lay.

In some instances of a line detection algorithm, a line is detected by finding the number of intersections between curves. The more curves intersecting means that the line represented by that intersection has more points. In some instances, a threshold is defined indicating the minimum number of intersections needed to detect a line.

In some instances, a Hough line transform algorithm is utilized that takes this approach. The algorithm keeps track of the intersection between curves of every point in the image. If the number of intersections is above some threshold, then it declares it as a line with the parameters (theta, rtheta) of the intersection point.

At "3" in FIG. 7 all lines within the image/video data 120 are shown. However, once the lines are detected, the lines may be filtered. For example, in some instances, the lines may be filtered by their coordinates. As an example, to detect the passenger's front window, a line associated with the passenger's front window may not start from the right half of the image/video data 120. Additionally, the lines may be filtered by their angle. In some instances, an arctan function may be used to calculate the angle of the line. Lines that have an angle greater than a threshold, such as greater than fifty (50) degrees, or smaller than a threshold, such as less than three (3) degrees, may be filtered. After filtering these lines, such as based on the coordinates of the line and/or their angle, of the lines that are remaining, a longest line may be selected.

At "4" in FIG. 7, for example, the best lines corresponding to the passenger's front window are shown. Once these best lines are discovered, to alter the motion zone 140, and using the line equation for the passenger's front window, coordinates of the existing motion zone 140 may be substituted with coordinates of the line. For example, the X coordinate of an existing motion zone point may be used to obtain the position (Y coordinate) on the line. In some instances, this may occur for three (or two) top left motion zone points. In some instances, instead of identifying the front driver window, the passenger front window line may be mirrored over the middle of an image, to determine corresponding motion zone points. In some instances, the modified motion zone may be lowered by a small offset (e.g. 10 pixels) to avoid edge cases with a motion zone overlapping windows. At "5" in FIG. 8, for example, the motion zone 140 is defined by mirroring the front passenger window to the driver's side.

The above discussion is with regard to altering sides of the motion zone 140. However, in some instances, it may be beneficial to alter the middle points of the motion zone 140 that correspond to the back window. In some instances, the process to identify the back window may be similar to identifying the passenger's front window. For example, the image may be converted to black and white, the image may be blurred (e.g., using a Gaussian blur) to make minor lines less detectable, edges may be detected using the canny edge detection algorithm, lines may be detected using the Hough line transformation algorithm, and then lines may be filtered. However, therein different filters may be applied.

In some instances, lines located in the middle of the image, or crossing a middle point of the image may be prioritized for selection. In some instances, lines with an angle close to zero (0), that is, horizontal, may be prioritized for selection. In some instances, a preferred line is selection based on a score generated using one or more metrics. These metrics may include, for example, angle, length, presence crossing a middle point of the image, etc.

In some instances, a motion zone is modified or altered based on one or more lines selected as a back window line. In some instances, to facilitate this, a detected and selected line corresponding to a back window is mirrored over a middle point of the image. In some instances, the mirroring may be useful because the line detected may indicate window boundaries narrower than the actual extent of the back window.

In some instances, a leftmost starting point of a back window line is projected onto a determined front passenger window line (e.g. extended in a continuing or estimated direction to meet the front passenger window line or extended in a horizontal direction to meet the front passenger window line). By this action, an approximate estimated position of the left lower corner point of the back window may be determined. In some instances, this is mirrored to determine an approximate estimated position of the right lower corner point of the back window. In some instances, these two corner points are utilized as top points for the motion zone 140, and are connected with the middle of motion zone 140, or a line is drawn between them to connect them and form the motion zone 140, or the determined back window line is used to the extent available for the motion zone 140. In some instances, one or more points or portions of a determined motion zone are lowered a preconfigured or determined amount (e.g., ten pixels).

As a result of detecting the windows, the preconfigured motion zone 140 may be modified using the boundaries of the front passenger window and/or the back window. For example, the boundaries of the front passenger window and the back window may be used as an upper boundary of the motion zone 140. At this point, the device 100 may have an updated motion zone 140 that is adapted to the vehicle 102 and the placement of the device 100.

FIGS. 9-13 illustrate various processes for determining motion events 112. The processes described herein is illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, devices, and systems described in the examples herein, such as, for example those described with respect to FIGS. 1-8, although the processes may be implemented in a wide variety of other environments, architectures, devices, and systems.

Figure 9:
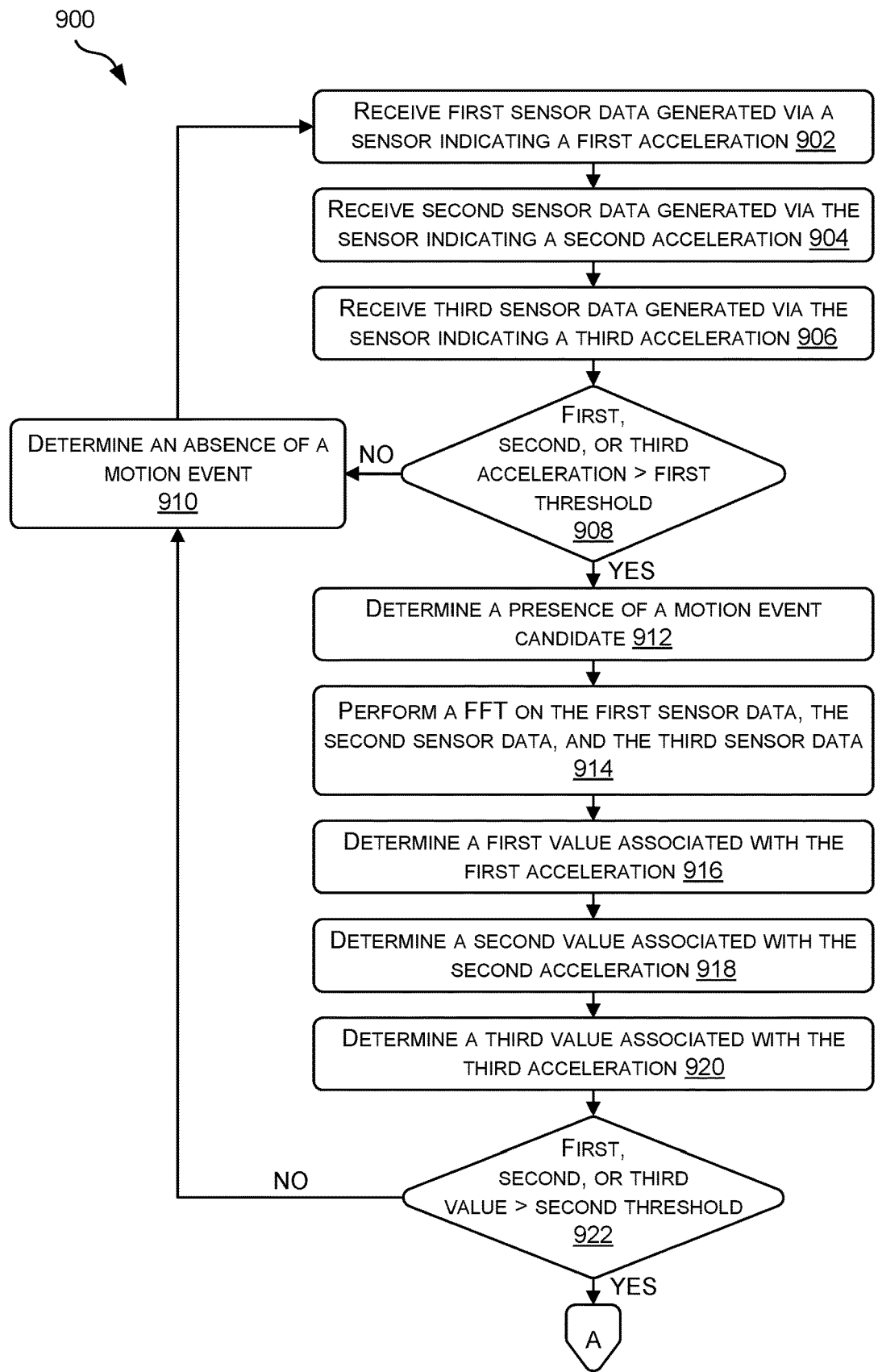
FIGS. 9 and 10 illustrate an example process for detecting motion events using the device of FIG. 1, according to an example of the present disclosure.
Figure 10:
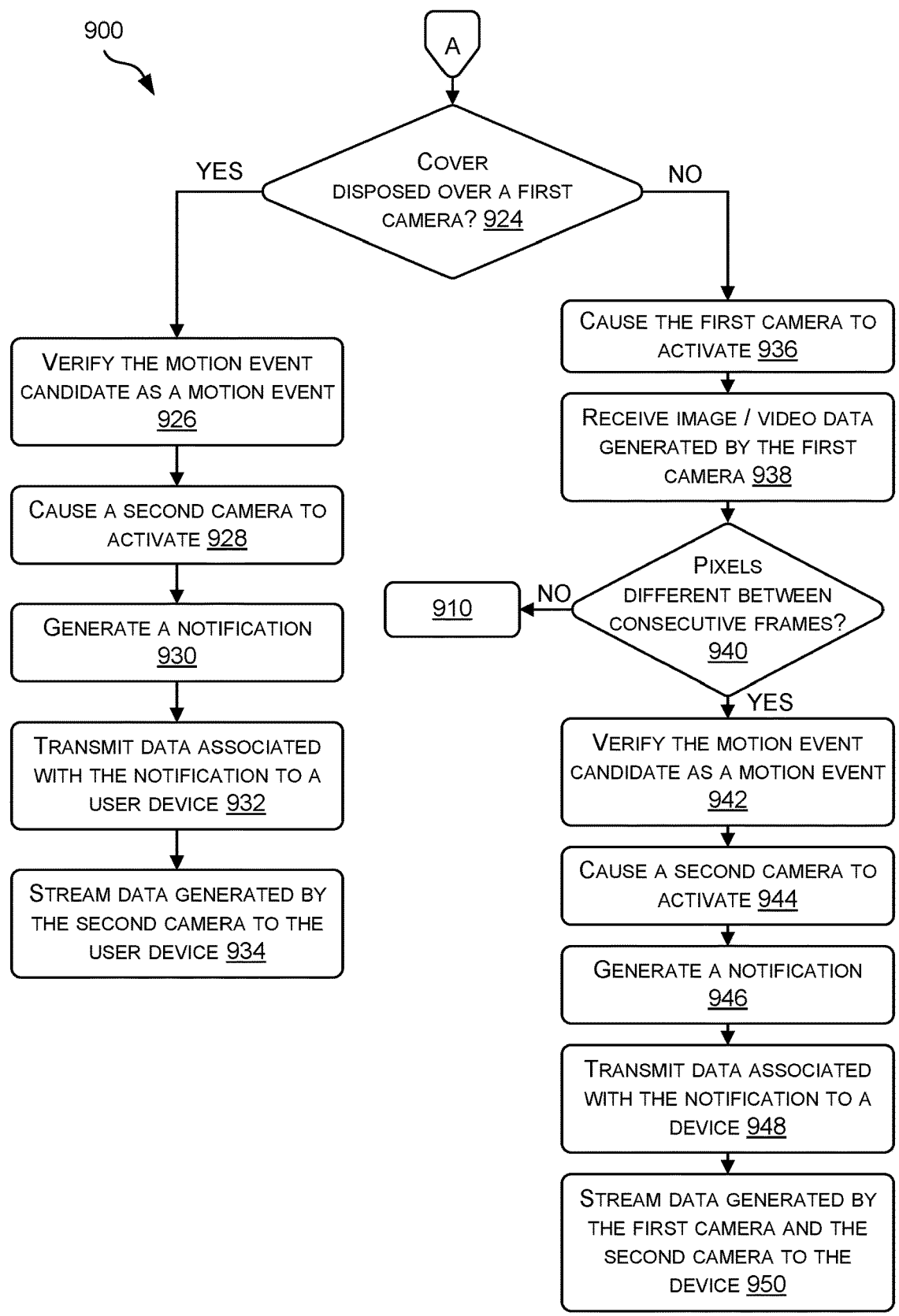

FIG. 9 illustrates an example process 900 for determining motion events, according to examples of the present disclosure. At 902, the process 900 may include receiving first sensor data generated via a sensor indicating a first acceleration. For example, the process 900 may receive the first sensor data generated via the accelerometer 124, where the first sensor data indicates an acceleration of the device 100 along the first axis. As such, the first acceleration may be along a first axis, such as the X-axis of the device 100. In some instances, the first acceleration may be an average acceleration over a window of time. For example, over the window of time, the accelerations along the first axis may be averaged. In some instances, the first sensor data may be received when the device 100 is configured to monitor an environment, such as the vehicle 102, for use in determining the motion events 112.

At 904, the process 900 may include receiving second sensor data generated via the sensor indicating a second acceleration. For example, the process 900 may receive the second sensor data generated via the accelerometer 124, where the second sensor data indicates an acceleration of the device 100 along a second axis. As such, the second acceleration may be along the second axis, such as the Y-axis of the device 100. In some instances, the second acceleration may be an average acceleration over a window of time. For example, over the window of time, the accelerations along the second axis may be averaged. In some instances, the second sensor data may be received when the device 100 is configured to monitor an environment, such as the vehicle 102, for use in determining the motion events 112.

At 906, the process 900 may include receiving third sensor data generated via the sensor indicating a third acceleration. For example, the process 900 may receive the third sensor data generated via the accelerometer 124, where the third sensor data indicates an acceleration of the device 100 along a third axis. As such, the third acceleration may be along the third axis, such as the Z-axis of the device 100. In some instances, the third acceleration may be an average acceleration over a window of time. For example, over the window of time, the accelerations along the third axis may be averaged. In some instances, the third sensor data may be received when the device 100 is configured to monitor an environment, such as the vehicle 102, for use in determining the motion events 112.

Although 902-906 are described as separate operations of the process 900, in some instances, the process 900 may receive the accelerometer data 122 from the accelerometer 124, and segment the accelerometer data 122 into separate components such as the acceleration along the first axis, the second axis, and the third axis. Here, the accelerometer data 122 may individually indicate the acceleration of the device 100 along the first axis, the second axis, and the third axis. In some instances, the accelerometer data 122 from the accelerometer 124 may be raw sensor data.

At 908, the process 900 may include determining whether the first acceleration, the second acceleration, or the third acceleration is greater than a first threshold. For example, upon determining the first acceleration, the second acceleration, or the third acceleration from the accelerometer data, the process 900 may compare the first acceleration, the second acceleration, or the third acceleration to a first threshold. In some instances, the first threshold may be associated with a threshold amount of acceleration indicative of motion within the vehicle 102. In some instances, the threshold amount of acceleration may be associated with an epsilon-interval. For example, if the first acceleration, the second acceleration, or the third acceleration is above the first threshold (e.g., outside of an epsilon-interval), the first acceleration, the second acceleration, or the third acceleration may be considered to be a motion event candidate 126. In some instances, instead of comparing the first acceleration, the second acceleration, or the third acceleration to the first threshold, the first acceleration, the second acceleration, or the third acceleration may be compared against an expected range of acceleration for the device 100. In some instances, the first acceleration, the second acceleration, or the third acceleration may be compared against the same threshold (e.g., the first threshold), or the first acceleration, the second acceleration, or the third acceleration may be compared to their own respective thresholds.

If at 908, the process 900 determines that none of the first acceleration, the second acceleration, or the third acceleration are greater than the first threshold, the process 900 may follow the "NO" route and proceed to 910.

At 910, the process 900 may include determining an absence of a motion event. For example, because the first acceleration, the second acceleration, or the third acceleration is not greater than the first threshold, the device 100 may not have experienced a motion event 112. From 910, the process 900 may continue to 902, whereby the process 900 may continue to receive sensor data 142 (e.g., the acceleration data 122) for use in determining motion event candidates 126 and/or motion events 112.

Alternatively, if at 908, the process 900 determines that the first acceleration, the second acceleration, or the third acceleration is greater than the first threshold, the process 900 may follow the "YES" route to 912. In some instances, the process 900 may proceed to 912 if any one of the first acceleration, the second acceleration, or the third acceleration is greater than the first threshold, if more than one of the first acceleration, the second acceleration, or the third acceleration is greater than the first threshold, or if all of the first acceleration, the second acceleration, and the third acceleration are greater than the first threshold.

At 912, the process 900 may include determining a presence of a motion event candidate. For example, because at least one of the first acceleration, the second acceleration, or the third acceleration is greater than the first threshold, the device 100 may have experienced a motion event candidate 126. In some instances, determining the presence of the motion event candidate 126 is used to perform subsequent processing to confirm the motion event candidate 126. For example, in some instances, operations 902-912 may be considered as the first stage of the acceleration-based algorithm 114 in which the sensor data 142 is processed to determine the motion event candidates 126. If so, and as denoted by the process 900 following 912, the device 100 may perform additional processing to confirm the motion event candidate 126 as a motion event 112, or to reject the motion event candidate 126 as a motion event 112.

At 914, the process 900 may include performing a FFT on the first sensor data, the second sensor data, and the third sensor data. For example, the process 900 may apply a FFT to accelerometer values of time-domain data to generate three sets of frequency-domain data. The FFT may be applied to the accelerometer values for each of the axes (e.g., the first axis, the second axis, and the third axis). In other words, frequency-domain data may be generated for a first axis (e.g., X-axis), frequency-domain data may be generated for a second axis (e.g., Y-axis), and frequency-domain data may be generated for a third axis (e.g., Z-axis). In some instances, the FFT is calculated using a series of 128 input accelerometer values for each axis.

At 916, the process 900 may include determining a first value associated with the first acceleration. For example, after performing the FFT, and using a first set of frequency-domain data associated with the first axis, the process 900 may sum the largest frequency values over a measured interval. In some instances, the summed frequency values may be a predetermined number of frequency coefficients (e.g., 10%, 13%, etc.) that represent the highest magnitude frequency over the measured interval. The first value obtained may therefore represent a sum of the largest frequency values (e.g., the top 10% values) in the first axis for the measured interval.

At 918, the process 900 may include determining a second value associated with the second acceleration. For example, after performing the FFT, and using a second set of frequency-domain data associated with the second axis, the process 900 may sum the largest frequency values over a measured interval. In some instances, the summed frequency values may be a predetermined number of frequency coefficients (e.g., 10%, 13%, etc.) that represent the highest magnitude frequency over the measured interval. The second value obtained may therefore represent a sum of the largest frequency values (e.g., the top 10% values) in the second axis for the measured interval.

At 920, the process 900 may include determining a second value associated with the second acceleration. For example, after performing the FFT, and using a second set of frequency-domain data associated with the second axis, the process 900 may sum the largest frequency values over a measured interval. In some instances, the summed frequency values may be a predetermined number of frequency coefficients (e.g., 10%, 13%, etc.) that represent the highest magnitude frequency over the measured interval. The second value obtained may therefore represent a sum of the largest frequency values (e.g., the top 10% values) in the second axis for the measured interval.

As such, for each of the operations 914-920, a predetermined number of frequency coefficients (e.g., 10%) that represent the highest magnitude frequency along the axes are selected. These magnitude frequency values may be summed for each axis to obtain three values, one for each axis, where the three values represent a sum of the largest frequency values for the accelerometer data over a measured interval. In other words, frequency-domain data may be generated for the first axis (e.g., X-axis), frequency-domain data may be generated for the second axis (e.g., Y-axis), and frequency-domain data may be generated for the third axis (e.g., Z-axis), and a portion of the frequency-domain data may be summed to obtain three values, one for each axis.

At 922, the process 900 may include determining whether the first, second, or third value is greater than a second threshold. In some instances, each of the first value, the second value, and/or third value may be compared to respective thresholds. For example, once the values along each of the axes are summed, each of the three values (e.g., a value for the X-axis, a value for the Y-axis, and a value for the Z-axis) may be compared to a respective threshold. The thresholds to which the three values are compared may be different depending upon the axis. For example, the value for the X-axis may be compared to a first of the second thresholds, the value for the Y-axis may be compared to a second of the second thresholds, and/or the value for the Z-axis may be compared to a third of the second thresholds. If all of the values are greater than their respective thresholds, the motion event candidate 126 may be confirmed as a motion event 112. In some instances, each of the first value, the second value, and the third value may need to be greater than their respective thresholds for confirming the motion event candidate 126 as a motion event 112. In other instances, at least one of the first value, the second value, and the third value may need to be greater than their respective thresholds for confirming the motion event candidate 126 as a motion event 112.

If at 922, the process 900 determines that the first value, the second value, or the third value is not greater than the second threshold, the process 900 may follow the "NO" route and proceed to 912 to determine the absence of the motion event 112. Alternatively, if at 912 the process 900 determines that the first value, the second value, and/or the third value are greater than the second threshold, the process 900 may follow the "YES" route and proceed to "A," which is discussed in FIG. 10 as a continuation of the process 900. In some instances, the operations 914-922 are associated with the second stage of the acceleration-based algorithm 114 in which the FFT is performed on the sensor data 142 to obtain three values that represent a sum of the largest frequency values for the sensor data 142 over the measured interval, and therein determine whether the whether the values are greater than thresholds.

From "A" the process 900 continues to 924, whereby the process 900 determines whether a cover is disposed over a first camera. For example, the process 900 may determine whether the privacy cover 200 is disposed over the first camera 106(1). Whether the first camera 106(1) is disposed over the first camera 106(1) may be based on receiving sensor data 142 for the hall-effect sensor, for example. However, the position of the privacy cover 200, or whether the first camera 106(1) is occluded, may be determined using other processes. In some instances, whether the privacy cover 200 is disposed over the first camera 106(1) may be used to dictate how the motion event candidate 126 is confirmed. If at 924, the process 900 determines that the cover is disposed over the first camera 106(1), the process 900 may follow the "YES" route and proceed to 926.

At 926, the process 900 may include verifying the motion event candidate as a motion event. For example, if the privacy cover 200 is disposed over the first camera 106(1), the process 900 may only use the acceleration-based algorithm 114 to detect and confirm the motion event candidate 126 as a motion event 112. In such instances, the process 900 may not utilize the image-based algorithm 116 to confirm the motion event candidate 126. As such, here, the second stage of the acceleration-based algorithm 114 may be used to confirm the motion event candidate 126.

At 928, the process 900 may include causing a second camera to activate. For example, in response to determining the motion event 112, the process 900 may include causing the second camera 106(2) to activate to begin capture image/video data 120. In some instances, the second camera 106(2) may be powered off, but in response to the motion event 112 being confirmed, the second camera 106(2) may be activated to begin recording the image/video data 120. That is, being as the first camera 106(1) may be occluded, the device 100 may cause the second camera 106(2) to be activated.

At 930, the process 900 may include generating a notification associated with the motion event. For example, in response to the motion event 112 being verified, the process 900 may generate the notification 118. In some instances, the notification 118 may include an indication that motion was detected, a time associated with the motion being detected, a location of the motion, and so forth.

At 932, the process 900 may include transmitting data associated with the notification to a user device. For example, the device 100 may transmit data representing the notification 118 to the user device 130. In some instances, the device 100 may transmit the data directly to the user device 130, or the data may first be transmitted to the remote computing resource(s) 144, and thereafter, provided to the user device 130.

At 934, the process 900 may include streaming data generated by the second camera to the user device. For example, the image/video data 120 as generated by the second camera 106(2) may be provided as a stream to the user device 130. In turn, the user is able to visually observe the motion event 112 as detected by the device 100. In some instances, the image/video data 120 may be transmitted as part of the transmitting the data associated with the notification 118 to the user device 130 (e.g., at 932).

Alternatively, if at 934, the process 900 determines that the cover is not disposed over the first camera 106(1), the process 900 may follow the "NO" route and proceed to 936.

At 936, the process 900 may include causing the first camera to activate. For example, the process 900 may include causing the first camera 106(1) to activate to begin capture image/video data 120. In some instances, the first camera

106(1) may be powered off, but in response to the acceleration-based algorithm 114 detecting the motion event candidate 126, the first camera 106(1) may be activated to begin recording the image/video data 120. The image/video data 120 as captured by the first camera 106(1) may be used in the image-based algorithm 116 to confirm the motion event candidate 12.

At 938, the process 900 may include receiving image/video data generated by the first camera. For example, in response to the first camera 106(1) being activated, the process 900 may receive the image/video data 120 as generated by the first camera 106(1). In some instances, the process 900 may continuously receive the image/video data 120 as generated by the first camera 106(1).

At 940, the process 900 may include determining whether pixels between consecutive frames are different than a threshold amount. For example, using the image-based algorithm 116, the process 900 may analyze consecutive frames to determine an amount of pixels that are different. By analyzing the pixels across consecutive frames, and determining that a threshold number of the pixels are different, the motion event candidate 126 may be confirmed or rejected as a motion event 112. If there are a threshold number of pixels that are different among consecutive frames, the frames may be considered different. As frames are captured, the frames may be compared to a previous frame by counting the number of pixels that differ by more than a threshold amount. In some instances, if the pixel values differ by more than 25-35 on a 255 scale, the pixels may be different between consecutive frames. If the percentage of pixels is greater than a threshold, then the frame is considered different. Correspondingly, if there are a threshold number of frames that are identified as different, the motion event candidate is verified. In some instances, the amount or duration of the frames used may be greater than a certain time period. For example, in some instances, 1.2 seconds worth of frames may be compared to one another to determine the differences therebetween and whether the motion event candidate 126 is verified.

If the process 900 determines that the pixels are not different between consecutive frames, or a threshold amount of frames are not different over a certain time interval, the process 900 may follow the "NO" route and proceed to 910 to determine an absence of a motion event. In response, the notification 118 may not be provided to the user. Conversely, if at 940 the process 900 determines that the pixels are different between consecutive frames, or a threshold amount of frames are different over a certain time interval, the process 900 may follow the "YES" route and proceed to 942 to verify the motion event candidate 126 as a motion event 112.

At 944, the process 900 may include causing the second camera to activate. For example, in response to determining the motion event 112, via the image-based algorithm 116, the process 900 may include causing the second camera 106(2) to activate to begin capture the image/video data 120. In some instances, the second camera 106(2) may be powered off, but in response to the motion event 112 being confirmed, the second camera 106(2) may be activated to begin recording the image/video data 120.

At 946, the process 900 may include generating a notification associated with the motion event. For example, in response to the motion event 112 being verified, the process 900 may generate the notification 118. In some instances, the notification 118 may include an indication that motion was detected, a time associated with the motion being detected, a location of the motion, and so forth.

At 948, the process 900 may include transmitting data associated with the notification to a user device. For example, the device 100 may transmit data representing the notification 118 to the user device 130. In some instances, the device 100 may transmit the data directly to the user device 130, or the data may first be transmitted to the remote computing resource(s) 144, and thereafter, provided to the user device 130.

At 950, the process 900 may include streaming data generated by the first camera and the second camera to the user device. For example, the image/video data 120 as generated by the first camera 106(1) and the second camera 106(2) may be provided as a stream to the user device 130. In turn, the user is able to visually observe the motion event 112 as detected by the device 100. In some instances, the image/video data 120 may be transmitted as part of the transmitting the data associated with the notification to the user device 130.

Although the process 900 is shown and described as using the image-based algorithm 116 after the two stages of the acceleration-based algorithm 114, in some instances, the image-based algorithm 116 may be employed after the first stage (e.g., after 912) and in response to the privacy cover 200 being in the retracted state.

Figure 11:
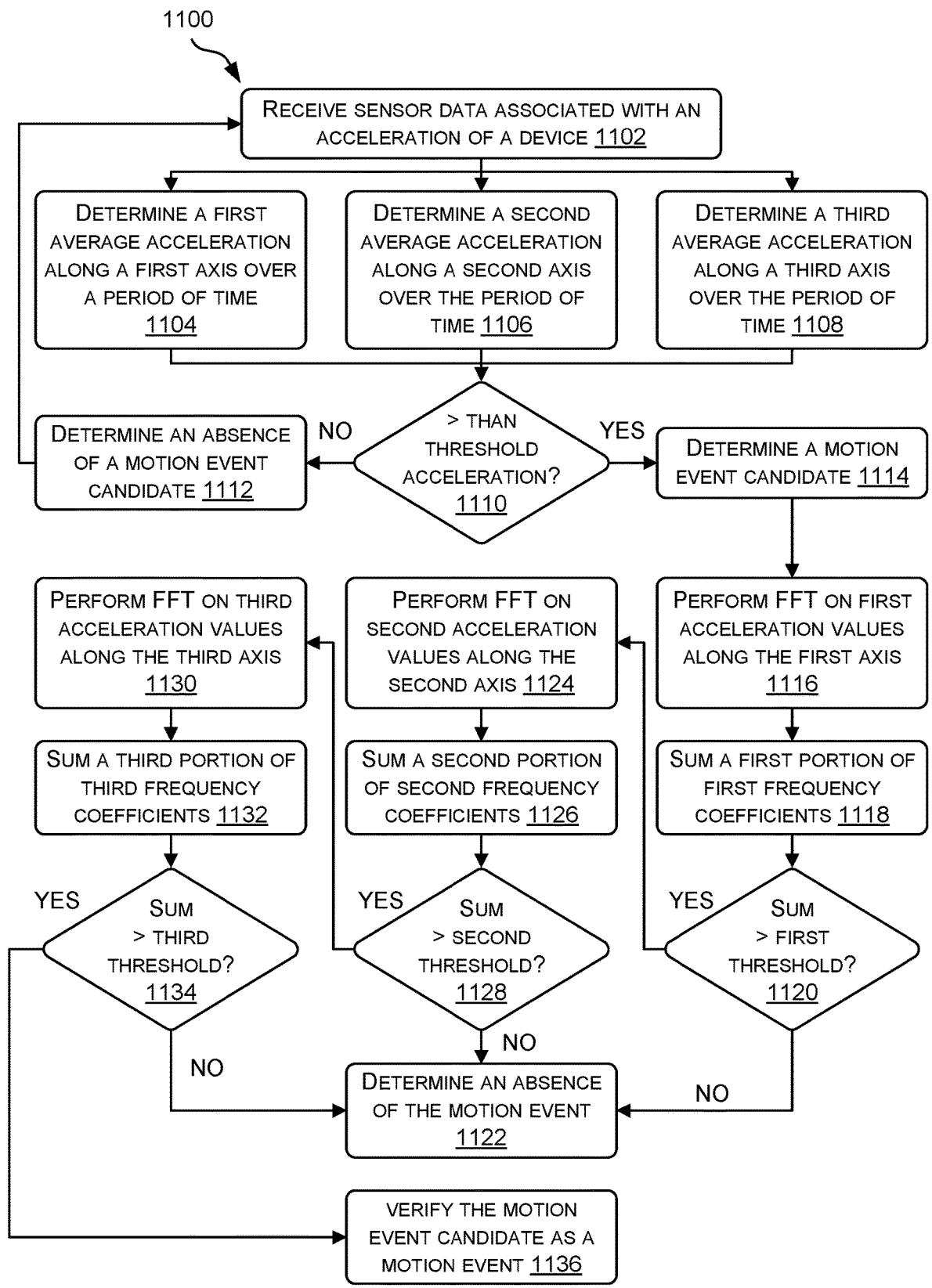
FIG. 11 illustrates an example process for detecting motion events using the device of FIG. 1, according to an example of the present disclosure.

FIG. 11 illustrates an example process 1100 for using the acceleration-based algorithm 114 to determine motion events candidates 126 and to verify the motion event candidate 126 as a motion event 112.

At 1102, the process 1100 may include receiving sensor data associated with an acceleration of a device. For example, the process 1100 may receive the accelerometer data 122 generated by the accelerometer 124 of the device 100. The accelerometer data 122 may include the acceleration of the device 100 along different axes. For example, the accelerometer data 122 may indicate the acceleration of the device 100 along the first axis, the second axis, and the third axis. In some instances, the accelerometer data 122 from the accelerometer 124 at 1102 may be raw data.

At 1104, the process 1100 may include determining a first average acceleration along a first axis over a period of time. For example, using the accelerometer data 122, the process 1100 may determine a first acceleration of the device 100 along a first axis (e.g., X-axis). In some instances, the first acceleration may be over a period of time (e.g., 5 ms, 1 s, etc.), and over the period of time, the first acceleration may represent an average acceleration experienced by the device along the first axis.

At 1106, the process 1100 may include determining a second average acceleration along a second axis over the period of time. For example, using the accelerometer data 122, the process 1100 may determine a second acceleration of the device 100 along a second axis (e.g., Y-axis). In some instances, the second acceleration may be over the same period of time as the first acceleration, or a different period of time. Regardless, over the period of time, the second acceleration may represent an average acceleration experienced by the device along the second axis.

At 1108, the process 1100 may include determining a third average acceleration along a third axis over the period of time. For example, using the accelerometer data 122, the process 1100 may determine a third acceleration of the device 100 along a third axis (e.g., Z-axis). In some instances, the third acceleration may be over the same period of time as the first acceleration and/or the second acceleration, or a different period of time. Regardless, over the period of time, the third acceleration may represent an average acceleration experienced by the device along the third axis.

At 1110, the process 1100 may include determining whether the first average acceleration, the second average acceleration, and/or the third average acceleration is greater than a threshold. For example, upon determining the first average acceleration, the second average acceleration, or the third average acceleration from the accelerometer data 122, the process 1100 may compare the first average acceleration, the second average acceleration, and/or the third average acceleration to the threshold acceleration. In some instances, the threshold acceleration may be associated with a threshold amount of acceleration indicative of motion within the vehicle. In some instances, the threshold acceleration may be associated with an epsilon-interval. For example, if the first average acceleration, the second average acceleration, and/or the third average acceleration is above the threshold acceleration (e.g., outside of an epsilon-interval), the first average acceleration, the second average acceleration, and/or the third average acceleration may be considered to be a motion event candidate 126. In some instances, if any of the first average acceleration, the second average acceleration, and/or the third average acceleration is greater than the threshold acceleration, the process 1100 may determine a motion event candidate 126. In other instances, at least two of the first average acceleration, the second average acceleration, and the third average acceleration may be greater than the threshold acceleration for determining the motion event candidate 126.

In some instances, at 1110, the first average acceleration, the second average acceleration, and the third average acceleration may be compared against the same threshold (e.g., the threshold acceleration), or the first average acceleration, the second average acceleration, and/or the third average acceleration may be compared to their own respective thresholds. In some instances, the operations 1104-1108 are performed in parallel to determine the average accelerations along each of the axes. Moreover, determining whether the first average acceleration, the second average acceleration, and/or the third average acceleration is greater than the threshold acceleration may also be performed in parallel.

If at 1110, the process 1100 determines that none of the first average acceleration, the second average acceleration, and/or the third average acceleration is greater than the threshold acceleration, the process 1100 may follow the "NO" route and proceed to 1112. At 1112, the process 1100 may include determining an absence of a motion event candidate. For example, because the first average acceleration, the second average acceleration, and/or the third average acceleration is not greater than the threshold acceleration, the device 100 may not have experienced a motion event candidate 126. From 1112, the process 1100 may continue to 1102, whereby the process 1100 may continue to receive the accelerometer data 122 for use in determining motion event candidates 126 and/or motion events 112.

Alternatively, if at 1110, the process 1100 determines that the first average acceleration, the second average acceleration, and/or the third average acceleration is greater than the threshold acceleration, the process 1100 may follow the "YES" route to 1114. In some instances, and as noted above, the process 1100 may proceed to 914 if any one of the first average acceleration, the second average acceleration, or the third average acceleration is greater than the threshold acceleration, if more than one of the first average acceleration, the second average acceleration, and the third average acceleration is greater than the first threshold, or if all of the first average acceleration, the second average acceleration, and the third average acceleration are greater than the threshold acceleration.

At 1114, the process 1100 may include determining a presence of a motion event candidate. For example, because at least one of the first average acceleration, the second average acceleration, or the third average acceleration is greater than the threshold acceleration, the device 100 may have experienced motion and the motion may be considered a motion event candidate 126. In some instances, the process of determining the motion event candidate 126 may be considered as the first stage of the acceleration-based algorithm 114 in which the accelerometer data 122 is processed to determine the motion event candidates 126. If so, and as denoted by the process 900, following 912, the device 100 may perform additional processing to confirm the motion event candidate 126 as a motion event 112, or to reject the motion event candidate 126 as a motion event 112.

At 1116, the process 1100 may include performing a FFT on first acceleration values along the first axis. For example, the process 1100 may apply a FFT to accelerometer values of time-domain data to generate frequency-domain data for the acceleration along the first axis. In some instances, the FFT is calculated using a series of 128 input accelerometer values for the first axis. In some instances, the FFT is calculated using the acceleration values over the period of time associated with the first average acceleration.

At 1118, the process 1100 may include summing a first portion of first frequency coefficients. For example, after performing the FFT, using a first set of frequency-domain data associated with the first axis, the process 1100 may sum the largest frequency values over the period of time. In some instances, the summed frequency values may be a predetermined number of first frequency coefficients (e.g., 10%, 13%, etc.) that represent the highest magnitude frequency over the period of time. The sum of the first portion of frequency coefficients may therefore represent a value of the largest frequency values (e.g., the top 10% values) in the first axis for the period of time.

At 1120, the process 1100 may include determining whether the sum of the first portion of first frequency coefficients is greater than a first threshold. The first threshold to which the sum of the first portion of frequency values are compared may be dependent upon the first axis. If at 1120, the process 1100 determines that the sum is not greater than the first threshold, the process 1100 may follow the "NO" route and proceed to 1122. At 1122, the process 1100 may include determining an absence of a motion event. For example, because the sum of the first frequency coefficients is not greater than the first threshold, the device 100 may not have experienced a motion event 112. Here, performing the FFT on the first acceleration values, and summing the portion of the values, to confirm the motion event candidate is more computationally intensive than determining that the first average acceleration is greater than the threshold acceleration (e.g., at operation 1110). As such, this second stage of the acceleration-based algorithm 114 may be used to confirm or deny the motion along the first axis. In some instances, from 1120, the process 1100 may continue to receive the accelerometer data 122 for use in determining motion event candidates.

Alternatively, if at 1120 the process 1100 determines that the sum is greater than the first threshold, the process 1100 may follow the "YES" route and proceed to 1124. At 1124, the process 1100 may include performing a FFT on second acceleration values along the second axis. For example, the process 1100 may apply a FFT to accelerometer values of time-domain data to generate frequency-domain data for the acceleration along the second axis. In some instances, the FFT is calculated using a series of 128 input accelerometer values for the second axis. In some instances, the FFT is calculated using the acceleration values over the period of time associated with the second average acceleration.

At 1126, the process 1100 may include summing a second portion of second frequency coefficients. For example, after performing the FFT, using a second set of frequency-domain data associated with the second axis, the process 1100 may sum the largest frequency values over the period of time. In some instances, the summed frequency values may be a predetermined number of frequency coefficients (e.g., 10%, 13%, etc.) that represent the highest magnitude frequency over the period of time. The sum of the second portion of second frequency coefficients may therefore represent a value of the largest frequency values (e.g., the top 10% values) in the second axis for the period of time.

At 1128, the process 1100 may include determining whether the sum of the second portion of second frequency coefficients is greater than a second threshold. The second threshold to which the sum of the second portion of frequency values are compared may be dependent upon the second axis. If at 1126, the process 1100 determines that the sum is not greater than the second threshold, the process 1100 may follow the "NO" route and proceed to 1122. Alternatively, if at 1128 the process 1100 determines that the sum is greater than the second threshold, the process 1100 may follow the "YES" route and proceed to 1130.

At 1130, the process 1100 may include performing a FFT on third acceleration values along the third axis. For example, the process 1100 may apply a FFT to accelerometer values of time-domain data to generate frequency-domain data for the acceleration along the third axis. In some instances, the FFT is calculated using a series of 128 input accelerometer values for the third axis. In some instances, the FFT is calculated using the acceleration values over the period of time associated with the third average acceleration.

At 1132, the process 1100 may include summing a third portion of third frequency coefficients. For example, after performing the FFT, using a third set of frequency-domain data associated with the third axis, the process 1100 may sum the largest frequency values over the period of time. In some instances, the summed frequency values may be a predetermined number of frequency coefficients (e.g., 10%, 13%, etc.) that represent the highest magnitude frequency over the period of time. The sum of the third portion of third frequency coefficients may therefore represent a value of the largest frequency values (e.g., the top 10% values) in the third axis for the period of time.

At 1134, the process 1100 may include determining whether the sum of the third portion of third frequency coefficients is greater than a third threshold. The third threshold to which the sum of the third portion of frequency values are compared may be dependent upon the third axis. If at 1132, the process 1100 determines that the sum is not greater than the third threshold, the process 1100 may follow the "NO" route and proceed to 1122. Alternatively, if at 1134 the process 1100 determines that the sum is greater than the third threshold, the process 1100 may follow the "YES" route and proceed to 1136.

At 1136, the process 1100 may include verifying the motion event candidate as a motion event. For example, the acceleration-based algorithm 114 may detect and confirm the motion event candidate 126 as a motion event 112. As such, for each axis, three values are obtained (e.g., the sum of the frequency coefficients) and the three values are compared to respective thresholds. If the three values are above their respective threshold, the motion event candidate 126 is confirmed as a motion event 112.

The process 1100 therefore illustrates a scenario by which the acceleration-based algorithm 114 is used to confirm motion event candidates 126 as motion events 112. In response, the device 100 may generate notification(s) 118 that include the image/video data 120 generated by the first camera 106(1) and/or the second camera 106(2). In some instances, however, and as discuss above with regard to the process 900, the image-based algorithm 116 may additionally or alternatively be used to confirm the motion event candidates 126 as motion events 112.

Additionally, although the process 1100 illustrates the operations 1116-1120, 1124-1128, and 1130-1134 being performed in series, in some instances, the operations 1116-1120, 1124-1128, and 1130-1134 may be performed in parallel. For example, the FFTs of the first acceleration values, the second acceleration values, and the third acceleration values may be performed in parallel, and thereafter, the sums of the first frequency coefficients, the second frequency coefficients, and the third frequency coefficients may be compared to their respective thresholds. In some instances, the FFTs may be performed in parallel while the comparison to the thresholds may be performed in series.

Figure 12:
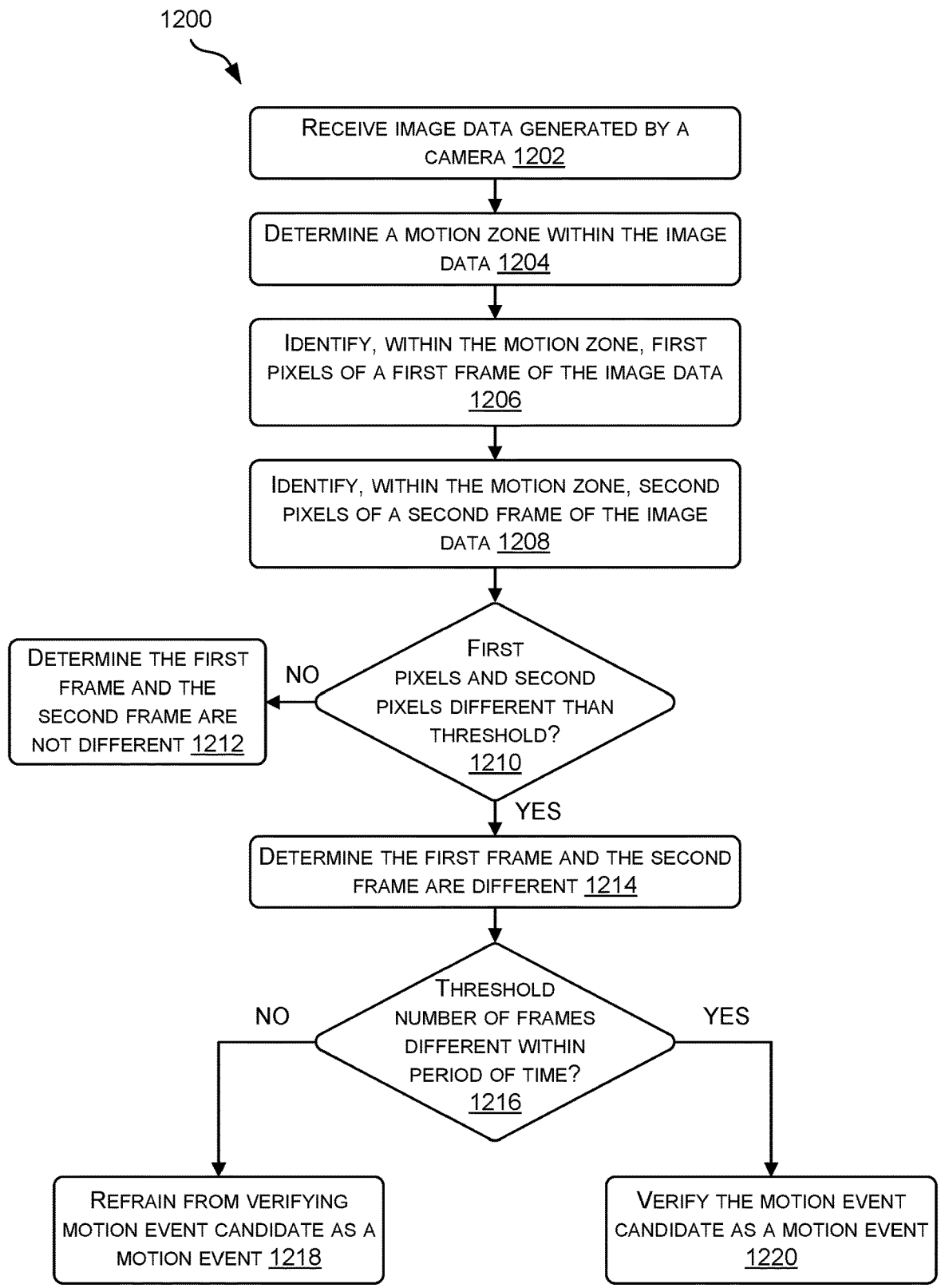
FIG. 12 illustrates an example process for detecting motion events using the device of FIG. 1, according to an example of the present disclosure.

FIG. 12 illustrates an example process 1200 for using the image-based algorithm 116 to determine motion events candidates 126 and/or to verify the motion event candidate 126 as a motion event 112. For example, the process 1200 may be performed after the process 900 (or certain operations thereof). For example, after the process 900 determines the motion event candidate 126, at operation 912, the image-based algorithm 116 may be used to verify the motion event candidate 126.

At 1202, the process 1200 may include receiving image/video data generated by a camera. For example, the first camera 106(1) may capture image/video data 120 of the interior of the vehicle 102. As noted above, the first camera 106(1) may capture the image/video data 120 in response to being activated when the acceleration-based algorithm 114 determines the motion event candidate 126. Moreover, the image/video data 120 may be received when the privacy cover 200 does not obstruct the first camera 106(1).

At 1204, the process 1200 may include determining a motion zone within the image data. For example, the image/video data 120 may represent an entirety of the interior of the vehicle 102, including the dashboard, seats, windows, and so forth. However, to determine the motion events 112, only a portion of the image/video data 120 is analyzed to confirm the motion event candidate 126. In some instances, the motion zone 140 may be selected by default, for example, by determining an average motion zone across a dataset (e.g., different vehicles). In some instances, the motion zone 140 may be programmable based on the type, make, and/or model of the vehicle 102. Still, in some instances, the motion zone 140 may be programmable via the user, for example. The motion zone 140 may be applied as a mask to the image/video data 120, and thereafter, the pixels within the mask may be analyzed by the image-based algorithm 116 for confirming the motion event candidate 126.

At 1206, the process 1200 may include identifying, within the motion zone, first pixels of a first frame of the image data. For example, for a first frame of the image/video data 120, first pixels within the motion zone 140 may be identified. These first pixels may have certain characteristics, such as color, black-white scale, hue, and so forth.

At 1208, the process 1200 may include identifying, within the motion zone, second pixels of a second frame of the image data. For example, for a second frame of the image/video data 120, second pixels within the motion zone 140 may be identified. These second pixels may have certain characteristics, such as color, black-white scale, hue, and so forth. In some instances, the first frame and the second frame are consecutive frames. As will be explained herein, the first pixels and the second pixels may be compared to one another to determine whether the first frame and the second frame are different. If the first frame and the second frame are different, this may signify motion within the vehicle 102.

At 1210, the process 1200 may include determining whether the first pixels and the second pixels are different. For example, the process 1200 (using the image-based algorithm 116) may compare the color, black-white scale, hue, and so forth between the first pixels and the second pixels. In some instances, between the first frame and the second frame, the image-based algorithm 116 may compare similar (i.e., the same) pixels to one another to determine a change (if any) of the pixel between the first frame and the second frame. If the pixels are different, the process 1200 may track (e.g., record) the number of pixels that are different between the first frame and the second frame.

In some instances, whether the first frame and the second frame are different may be based at least in part on a threshold number of first pixels and the second pixels being different. For example, the first pixels and the second pixels may be considered different if the pixel values differ by more than 25-35 on a 255 scale. Moreover, in some instances, if the percentage (or amount) of pixels is greater than a threshold (0.12*a time difference between the first frame and the second frame) the image-based algorithm 116 may determine that the first frame and the second frame are different.

If at 1210, the process 1200 determines that the first pixels and the second pixels are not different, the process 1200 may follow the "NO" route and proceed to 1212. At 1212, the process 1200 may include determining that the first frame and the second frame are not different. In such instances, the process 1200, using the image-based algorithm 116, determines that the motion event candidate 126 is not verified as a motion event 112. Accordingly, the process 1200 does not cause the notification to be generated and transmitted to the user device 130, for example. Alternatively, if at 1210 the process 1200 determines that the first pixels and the second pixels are different, the process 1200 may follow the "YES" route and proceed to 1214.

At 1214, the process 1200 may include determining that the first frame and the second frame are different. In some instances, to determine that the motion event candidate 126 corresponds to the motion event 112, the process 1200 may determine that a threshold number of frames are different. For example, in response to the frames being different, the process 1200 (or the image-based algorithm 116) may update a counter of different frames. Here, if the percentage of frames is greater than a threshold, then the motion event candidate 126 may be verified as a motion event 112.

At 1216, the process 1200 may include determining whether a threshold number of frames are different over a period of time. For example, for the period of time, the process 1200 may determine whether a threshold number of frames are different. In other words, for the motion event candidate 126 to be verified, a threshold number of frames may first be determined different. Accordingly, while the process 1200 may illustrate a comparison of two frames (e.g., the first frame and the second frame), the process 1200 may compare other frames to determine whether these other frames are different. For example, the process 1200 may compare the second frame and a third frame, the third frame and a fourth frame, and so forth. If the frames are different (e.g., by comparing the pixels), the process 1200 may update a counter of frames that are different and/or frames that are not different.

If at 1216, the process 1200 determines that the threshold number of frames are not different, the process 1200 may follow the "NO" route and proceed to 1218. Here, at 1218, the process 1200 may include refraining from verifying the motion event candidate as a motion event. For example, because the image-based algorithm 116 determines that there are insufficient frames that are different, the process 1200 may not confirm (i.e., reject) the motion event candidate as a motion event 112. Therein, the process 1200 may continue to receive image/video data 120 for comparing pixels across frames.

Alternatively, if at 1216 the process 1200 determines that the threshold number of frames are different, the process 1200 may follow the "YES" route and proceed to 1220. Here, at 1220, the process 1200 may include verifying the motion event candidate as a motion event. For example, because the process 1200, using the image-based algorithm 116, determined that the threshold number of frames are different, this may indicate motion within the vehicle 102. In such instances, the motion event candidate 126 is confirm as a motion event 112. In turn, the device 100 may generate the notification 118 and/or cause image/video data, from the first camera 106(1) and/or the second camera 106(2), to be streamed to the user device 130.

Accordingly, the process 1200 uses the image-based algorithm 116 to mitigate false positive motion events 112 (e.g., caused by rain, traffic, construction, etc.). In such instances, the image-based algorithm operates based on differences between consecutive frames and thresholds for pixel values. If there are a sufficient amount of different pixels amount consecutive frames, then the frames are considered different. Correspondingly, a sufficient number of different frames results in the motion event candidate 126 being verified as a motion event 112. In some instances, the amount of duration of the frames may be greater than a period of time (e.g., 1.2 seconds worth of frames). Moreover, if a certain amount of time lapses without the motion event candidate 126 being verified as a motion event 112, the motion event 112 will not be verified as a motion event 112.

Figure 13:
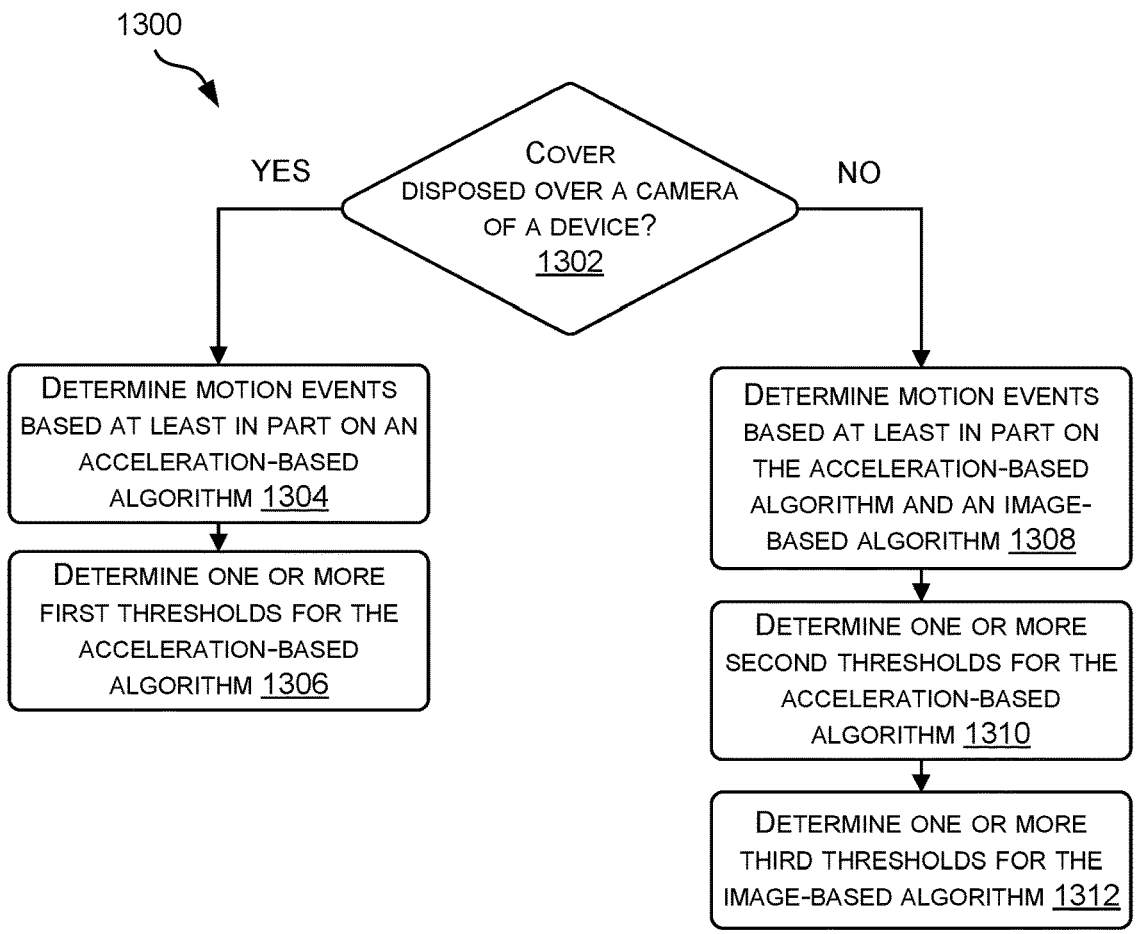
FIG. 13 illustrates an example process for determining how to detect motion events using the device of FIG. 1, according to an example of the present disclosure.

FIG. 13 illustrates an example process 1300 for determining how to verify motion event candidates 126 as motion events 112, as well as the threshold associated with verifying the motion event candidates, whether via the acceleration-based algorithm 114 and/or the image-based algorithm 116.

At 1302, the process 1300 may include determining whether the cover is disposed over a camera of a device. For example, the process 1300 may determine whether the privacy cover 200 is disposed over the first camera 106(1). In some instances, whether the first camera 106(1) is occluded (e.g., via the privacy cover 200) may determine how the motion event candidates 126 are verified. By way of example, if the privacy cover 200 is disposed over the first camera 106(1), then the image/video data 120 may be unable to be obtained for verifying the motion event candidate 126. As such, at the outset, the position of the privacy cover 200 may be determined for determining the process by which the motion event candidate 126 is verified. In some instances, the sensor(s) 104 (e.g., hall-effect sensor) are used to determine the position of the privacy cover 200 and whether the first camera 106(1) is occluded. If the privacy cover 200 is disposed over the first camera 106(1), the process 1300 may follow the "YES" route and proceed to 1304.

At 1304, the process 1300 may include determining motion events based at least in part on an acceleration-based algorithm. For example, with the first camera 106(1) being occluded, the motion event candidates 126 may be determined and confirmed as motion events 112 using the acceleration-based algorithm 114. Here, the acceleration-based algorithm 114 may perform the first stage for determining the motion event candidates 126, and the second stage for either confirming or rejecting the motion event candidate 126 as a motion event 112.

At 1306, the process 1300 may include determining one or more first thresholds for the acceleration-based algorithm. For example, in instances in which the image-based algorithm 116 is not used to verify the motion event candidates 126, or to filter false-positives, the acceleration-based algorithm 114 may use higher thresholds that if the image-based algorithm 116 is capable of being employed. However, being as the first camera 106(1) is occluded, the device 100 may rely solely on the acceleration-based algorithm 114 to detect the motion event candidates 126 and confirm the motion event candidates 126 as motion events 112.

In some instances, one or more first thresholds may be associated with the first stage or the second stage of the acceleration-based algorithm 114. For example, the acceleration of the device 100 as determined from the accelerometer data 122 (e.g., the raw accelerometer data 122) and which is compared to the threshold acceleration for determining the motion event candidate 126, may be determined based on the first camera 106(1) being occluded. Moreover, the value of the acceleration coefficients for the axes, once the FFT is performed, may be compared to a threshold that is higher than if the first camera 106(1) is not occluded. Once the one or more first thresholds are determined, the process 1300 may receive accelerometer data 122 (in response to motion being detected) for use in determining the motion event candidates 126 and verifying the motion event candidates 126.

Alternatively, if at 1302 the process 1300 determines that the cover is not disposed over the first camera 106(1) of the device 100, the process 1300 may follow the "NO" route and proceed to 1308. Here, at 1308, the process 1300 may include determining motion events based at least in part on the acceleration-based algorithm and an image-based algorithm. For example, if the privacy cover 200 is not occluding the first camera 106(1), the process 1300 may utilize image/video data 120 generated by the first camera 106(1) to verify the motion event candidates 126, as determined using the acceleration-based algorithm 114.

At 1310, the process 1300 may include determining one or more second thresholds for the acceleration-based algorithm. For example, if the privacy cover 200 is not occluding the first camera 106(1), the acceleration-based algorithm 114 may use lower thresholds for comparing the accelerometer data 122 (e.g., during the first stage). The use of the lower threshold may operate on the theory that the image/video data 120 as captured by the first camera 106(1) may be used to filter out false positives. As such, because the process 1300 will rely on the image-based algorithm 116, a lower threshold may be used for the acceleration-based algorithm 114. In some instances, when the process 1300 employs the image-based algorithm 116, the first stage and/or the second stage of the acceleration-based algorithm 114 may be used.

At 1312, the process 1300 may include determining one or more third thresholds for the image-based algorithm. For example, the process 1300 may include determining a threshold difference between the pixels to determine that the pixels are different, a threshold number of pixels that have to be different to consider the frames different, and/or a threshold number of frames that have to be different for confirming the motion event candidate 126 as a motion event 112. Once the one or more second thresholds and the one or more third thresholds are determined, the process 1300 may receive accelerometer data 122 (in response to motion being detected) for use in determining the motion event candidates 126 and verifying the motion event candidates 126.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An electronic device comprising:
   a camera;
   an accelerometer;
   a wireless transceiver;
   one or more processors; and
   one or more computer readable media containing computer executable instructions that, when executed by the one or more processors, cause the electronic device to perform operations comprising:
   determining, using accelerometer data, a first set of time-domain values, each value of the first set of time-domain values indicating a measurement with respect to a first axis at a respective time;
   determining, based on the first set of time-domain values, a second set of frequency-domain values, each value of the second set of frequency-domain values indicating a magnitude associated with a respective frequency range;
   determining, based on the second set of frequency-domain values, an acceleration value associated with the first axis;
   effecting, based on the acceleration value, image capture by the camera,
   accessing stored data indicating a portion of a field of view of the camera associated with an interior of a vehicle,
   determining, based on image data generated using the camera and the stored data indicating the portion of the field of view of the camera, a number of pixels corresponding to the portion of the field of view of the camera for which pixel data of a first frame differs from pixel data of a second frame by a threshold, and
   based on the number of pixels, sending notification data using the wireless transceiver.

2. The electronic device of claim 1, wherein the camera is oriented in a first direction, and wherein the electronic device further comprises a second camera oriented in a second direction, the second direction being opposite the first direction.

3. The electronic device of claim 1, wherein the stored data represents a mask indicating pixel locations corresponding to the portion of the field of view of the camera.

4. The electronic device of claim 1, the operations further comprising:
selecting, from the second set of frequency-domain values, a third set of one or more values, each of the one or more values of the first set being greater than any value of the second set that is not part of the third set;
determining, based on the third set of one or more values, the acceleration value; and
comparing the acceleration value to a second threshold associated with the first axis,
wherein effecting the image capture is based on comparing the acceleration value to the second threshold.

5. The electronic device of claim 1, wherein:
the entire field of view of the camera includes an environment external to the interior of the vehicle; and
the portion of the view of the camera excludes the environment external to the interior of the vehicle.

6. An electronic device comprising:
a camera;
an accelerometer;
a wireless transceiver;
one or more processors; and
one or more computer readable media containing computer executable instructions that, when executed by the one or more processors, cause the electronic device to perform operations comprising:
determining, based at least in part on accelerometer data generated using the accelerometer, one or more values,
determining whether the camera is in a privacy mode,
selecting, based at least in part on determining whether the camera is in a privacy mode, one or more thresholds,
comparing the one or more values to the one or more thresholds, and
based at least in part on comparing the one or more values to the one or more thresholds, sending notification data using the wireless transceiver.

7. The electronic device of claim 6, the operations further comprising:
effecting, based at least in part on the accelerometer data generated using the accelerometer, image capture by the camera;
accessing stored data indicating a portion of a field of view of the camera, the portion of the field of view of the camera being less than an entire field of view of the camera;
determining, based at least in part on image data generated using the camera and the stored data indicating the portion of the field of view of the camera, a number of pixel locations corresponding to the portion of the field of view of the camera that differ between a first frame and a second frame by a threshold amount; and
based at least in part on determining the number of pixel locations, sending the notification data using the wireless transceiver.

8. The electronic device of claim 7, the operations further comprising:
determining a number of frames in which pixel locations corresponding to the portion of the field of view of the camera differ between consecutive frames by the threshold amount;
determining that the number of frames is greater than a second threshold amount; and
based at least in part on that the number of frames being greater than the second threshold amount, sending the notification data using the wireless transceiver.

9. The electronic device of claim 6, wherein the notification data includes image data generated by the camera.

10. The electronic device of claim 9, wherein the camera is oriented in a first direction, further comprising a second camera that is oriented in a second direction different than the first direction, wherein the notification data includes second image data generated by the camera.

11. The electronic device of claim 6, wherein the one or more values includes:
a first acceleration of the electronic device along a first axis;
a second acceleration of the electronic device along a second axis; and
a third acceleration of the electronic device along a third axis.

12. The electronic device of claim 6, the operations further comprising:
determining, using the accelerometer data:
a first set of time-domain values along a first axis,
a second set of time-domain values along a second axis, and
a third set of time-domain values along a third axis;
determining, based on the first set of time-domain values and using a fast Fourier transform (FFT) algorithm, a first set of frequency-domain values;
determining, based on the second set of time-domain values and using the FFT algorithm, a second set of frequency-domain values;
determining, based on the third set of time-domain values and using the FFT algorithm, a third set of frequency-domain values;
selecting first values corresponding to a first predetermined number of greatest values within the first set of frequency-domain values;
selecting second values corresponding to a second predetermined number of greatest values within the second set of frequency-domain values;
selecting third values corresponding to a third predetermined number of greatest values within the third set of frequency-domain values;
comparing the first values to a first threshold;
comparing the second values to a second threshold; and
comparing the third values to a third threshold,
wherein sending the notification data using the wireless transceiver is further based at least in part on comparing the first values to the first threshold, the second values to the second threshold, and the third values to the third threshold.

13. The electronic device of claim 12, wherein:
comparing the first values to the first threshold comprises comparing a first sum of first values to the first threshold;
comparing the second values to the first threshold comprises comparing a second sum of second values to the second threshold;
comparing the third values to the third threshold comprises comparing a third sum of third values to the third threshold; and the first threshold is different than the second threshold, and the second threshold is different than the third threshold.

14. An electronic device comprising:
a camera;
an accelerometer;
a wireless transceiver;
one or more processors; and
one or more computer readable media containing computer executable instructions that, when executed by the one or more processors, cause the electronic device to perform operations comprising:
receiving image data generated by the camera that at least partially depicts an interior of a vehicle,
determining, based at least in part on the image data, first data indicating a first line corresponding to a passenger window of the vehicle,
determining, based at least in part on the first data, second data indicating a second line corresponding to a driver window of the vehicle, and
determining, based at least in part on the first data and the second data, third data indicating a portion of a field of view of the camera to utilize for motion detection, the portion of the field of view of the camera being less than an entire field of view of the camera.

15. The electronic device of claim 14, wherein the one or more computer readable media contain computer executable instructions that, when executed by the one or more processors, cause the electronic device to perform operations comprising storing the third data.

16. The electronic device of claim 15, wherein the one or more computer readable media contain computer executable instructions that, when executed by the one or more processors, cause the electronic device to perform operations comprising:
effecting, based on accelerometer data generated using the accelerometer, image capture by the camera,
accessing the third data indicating the portion of the field of view of the camera,
determining, based on second image data generated using the camera and the third data indicating the portion of the field of view of the camera, a number of pixels corresponding to the portion of the field of view of the camera for which pixel data of a first frame differs from pixel data of a second frame by a threshold, and
based at least in part on determining the number of pixels, sending notification data using the wireless transceiver.

17. The electronic device of claim 14, wherein the camera is oriented in a first direction, and wherein the electronic device further comprises a second camera oriented in a second direction, the second direction being opposite the first direction.

18. The electronic device of claim 14, wherein the third data represents a mask indicating pixel locations corresponding to the portion of the field of view of the camera.

19. The electronic device of claim 14, wherein the one or more computer readable media contain computer executable instructions that, when executed by the one or more processors, cause the electronic device to perform operations:
determining, using accelerometer data generated by the accelerometer, a first set of time-domain values, each value of the first set of time-domain values indicating a measurement with respect to a first axis at a respective time;
determining, based on the first set of time-domain values and using a fast Fourier transform (FFT) algorithm, a second set of frequency-domain values, each value of the second set of frequency-domain values indicating a magnitude associated with a respective frequency range;
selecting, from the second set of frequency-domain values, a third set of one or more values, each of the one or more values of the first set being greater than any value of the second set that is not part of the third set;
determining, based on the third set of one or more values, an acceleration value associated with the first axis;
comparing the acceleration value associated with the first axis to a second threshold associated with the first axis; and
effecting image capture is based on comparing the acceleration value to the second threshold.

20. A method comprising:
receiving image data generated by a camera of an electronic device located inside of a vehicle, the image data at least partially depicting an interior of the vehicle;
determining, based at least in part on the image data, first data indicating a first line corresponding to a passenger window of the vehicle;
determining, based at least in part on the first data, second data indicating a second line corresponding to a driver window of the vehicle; and
determining, based at least in part on the first data and the second data, third data indicating a portion of a field of view of the camera to utilize for motion detection.

21. The method of claim 20, wherein the method comprises sending the third data to the electronic device.

22. The method of claim 20, wherein determining the second data is based at least in part on mirroring the first line corresponding to the passenger window of the vehicle across a midline associated with the image data.

23. The method of claim 20, wherein determining the second data is based at least in part on mirroring the first line corresponding to the passenger window of the vehicle across a midpoint associated with the image data.

* * * * *